United States Patent [19]
Elson et al.

[11] 3,779,363
[45] Dec. 18, 1973

[54] DISC TYPE PATTERN MAKER AND METHOD

[75] Inventors: Ronald D. Elson, Merrill; Norman O. Krenke, Saginaw; Charles E. Ingram, Freeland, all of Mich.

[73] Assignee: Baker Perkins Inc., Saginaw, Mich.

[22] Filed: Sept. 21, 1970

[21] Appl. No.: 73,981

[52] U.S. Cl. ............................. 198/33 AB, 214/6 P
[51] Int. Cl. ............................................ B65g 47/24
[58] Field of Search.................... 198/24, 34, 103, 198/33 AB; 214/6 B, 6 P; 53/159

[56] References Cited
UNITED STATES PATENTS

| | | | |
|---|---|---|---|
| 2,977,002 | 3/1961 | Asp | 214/6 P |
| 2,985,322 | 5/1961 | Parker | 214/6 P |
| 3,523,616 | 8/1970 | Neely | 214/6 B |
| 3,637,093 | 3/1972 | Brockmuller | 214/6 P |

Primary Examiner—Edward A. Sroka
Attorney—Learman and McCulloch

[57] ABSTRACT

Pattern forming apparatus and methods for grouping food products, such as loaves of packaged bread, into any one of a plurality of different patterns comprising: a turntable; a longitudinally extending conveyor for conveying products in a longitudinal path along one side of the turntable; a pair of end-to-end transversely movable pusher members which are selectively, individually or collectively, movable for selectively pushing products from the conveyor to the turntable; and drive mechanism for turning the turntable through a partial revolution to reorient the products thereon prior to the products following being moved thereto.

55 Claims, 33 Drawing Figures

INVENTORS
RONALD D. ELSON
NORMAN O. KRENKE
CHARLES E. INGRAM

BY *Learman & McCulloch*
ATTORNEYS

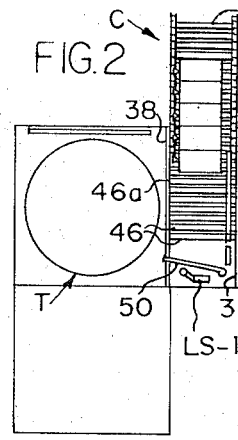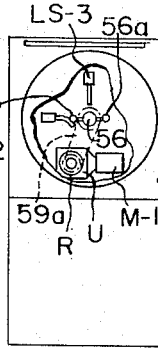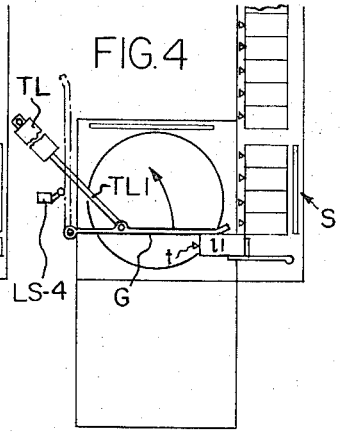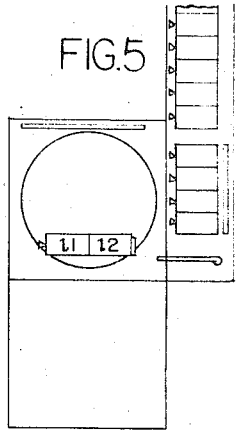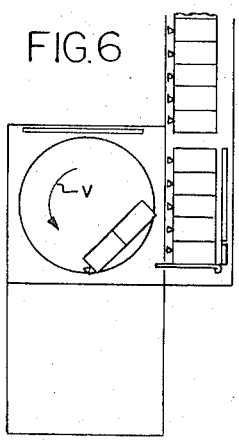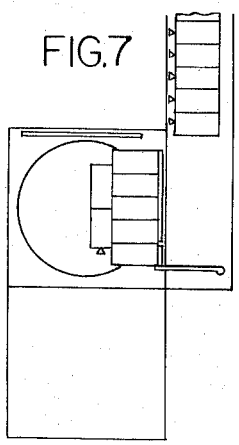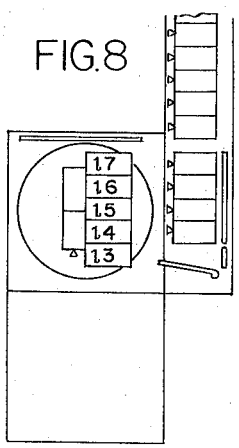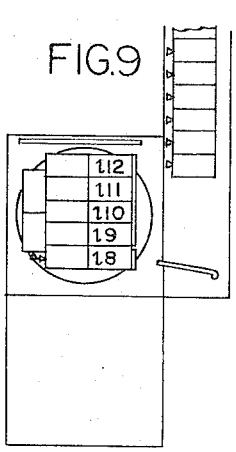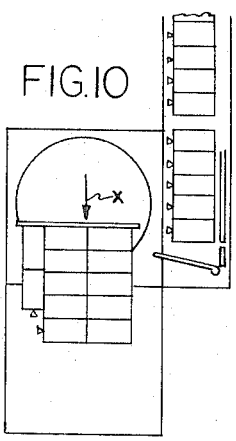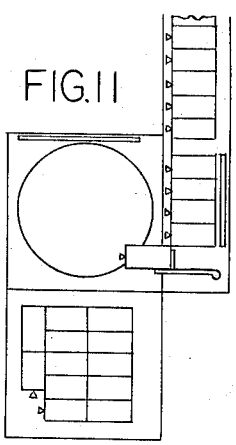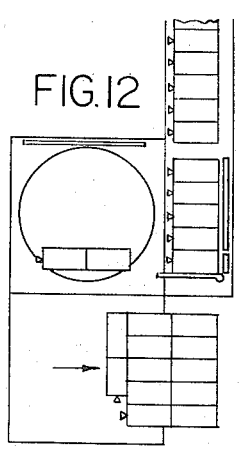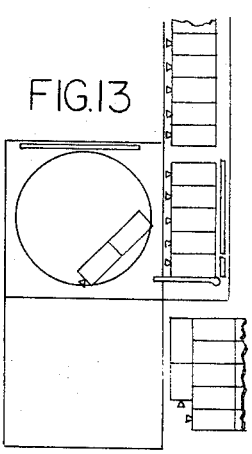

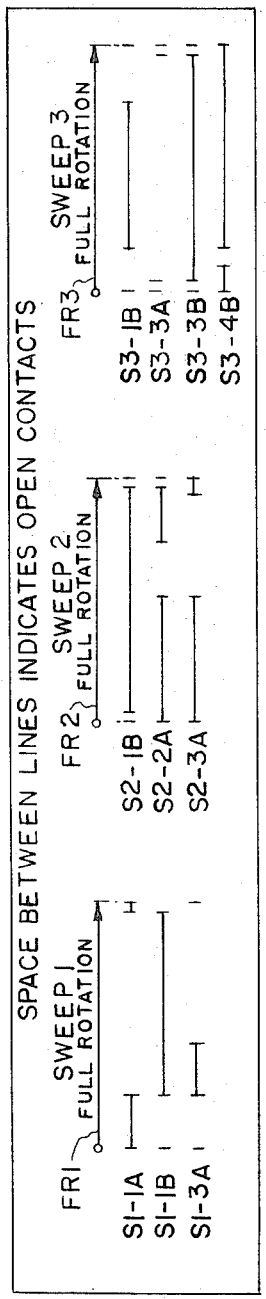

INVENTORS
RONALD D. ELSON
NORMAN O. KRENKE
CHARLES E. INGRAM
BY Learman & McCulloch
ATTORNEYS

DISC TYPE PATTERN MAKER AND METHOD

This invention relates to food handling equipment and more particularly to apparatus for grouping food products, such as packaged loaves of bread, in a predetermined array.

In one form of bread packaging machinery, loaves of bread are placed into individual plastic bags, and the open end of each plastic bag is gathered and a gripping closure is placed thereareound inwardly of the open end. The terminal portion of the bag outwardly of the closure expands to form a fantail end portion which is generally referred to in the bread packaging art as a "tail".

The packaged bread loaves are generally placed in trays or containers for transportation to retail outlets. When the bread loaves are placed on a tray with their "tails" extending outwardly beyond the side walls of the tray, the protruding "tails" occasionally catch either the processing machinery or the sides of the vehicle in which the bread carrying trays are being transported and are dragged off the trays. Such displaced loaves may be damaged and rendered unsalable. If the bread loaves can be positioned on the pallets such that the "tails" are positioned inwardly, this does not occur.

One of the prime objects of the present invention is to provide labor-saving pattern forming apparatus capable of selectively forming a variety of different patterns to suit a bakery's requirements, including patterns wherein all "tails" are inwardly disposed.

Another object of the present invention is to provide pattern forming apparatus capable of selectively forming a variety of different patterns, dependent on the size of the product being processed, that permit the maximum number of products to be loaded in a container.

A further object is to design economical and reliable operating machinery of this character which can be efficiently operated by relatively unskilled bakery personnel.

SUMMARY OF THE INVENTION

Briefly, according to the present invention, there is provided pattern forming apparatus for grouping food products into a selected patttern of a plurality of different patterns comprising: means for successively conveying products in a longitudinal path of travel, control circuit means adapted to be connected with a source of electrical power; means connected in said control circuit for moving the products from the conveying means and grouping the products into at least two adjacent rows disposed in a common plane; means connected in said control circuit with said moving and grouping means for selecting the number of rows to be grouped in said pattern by said grouping means; and turntable means connected in said control circuit for selectively turning the products in at least one of said rows to re-orient the products prior to the time the adjacent row is grouped therewith.

BRIEF DESCRIPTION OF DRAWINGS

Referring now to the drawings:

FIGS. 2 – 13 are schematic top plan views indicating sequential positions of the pattern forming apparatus and the bread loaves during the formation of one typical pattern;

FIG. 14a is a tabulation designating the respective switches, in the circuit illustrated in FIG. 14, which are closed when the selector switch is moved to any one of seven different positions to select any one of seven different basic patterns;

FIG. 14b is a tabulation diagrammatically illustrating the positions of the various cam operated switches during one complete cycle of operation;

FIG. 14c is a tabulation illustrating the position of the switching contacts of the stepping relays during the various steps of one complete cycle.

THE GENERAL SYSTEM

Figure 1:
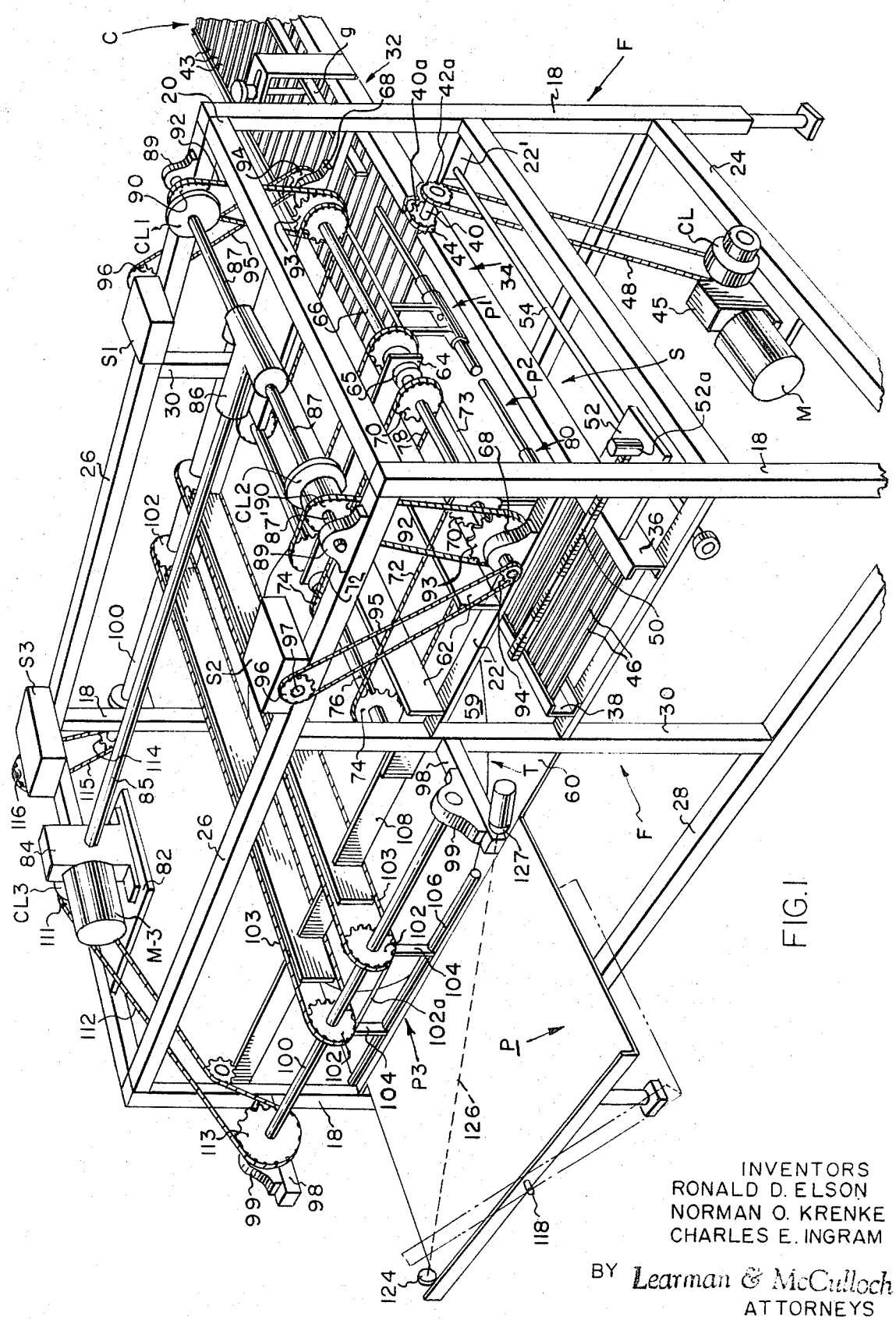
FIG. 1 is a perspective, partly schematic, front view of pattern forming apparatus constructed according to the present invention, some parts being broken away in the interest of clarity.

Referring now more particularly to the drawings, and in the first instance to FIGS. 1 – 4, apparatus constructed according to the preferred embodiment of the invention includes a longitudinally extending supply conveyor, generally designated C, for successively moving a plurality of packaged bread loaves $l$ to a transfer station, generally designated S, on the conveyor C. A turntable, generally designated T, is provided adjacent the transfer station S on conveyor C for receiving the loaves $l$ which are moved thereto from the transfer station S by a pair of pusher assemblies P1 and P2. The turntable T rotates in timed relation with the operation of the pusher assemblies P1 and P2 and the conveyor C in a manner to be later described. A third pusher assembly P3 is mounted transversely of the pusher assemblies P1 and P2 for moving groupings of articles formed in particular patterns from the turntable T onto a discharge plate P.

DESCRIPTION OF THE PREFERRED EMBODIMENT

Apparatus constructed according to the present invention is supported on a portable frame, generally designated F, including pairs of vertically extending, quadrilaterally arranged end legs 18 connected by upper, middle, and lower horizontal end connecting members 20, 22 and 24, respectively, and upper and lower side rails 26 and 28. A vertically extending support post 30 spans each pair of upper and lower side rails 26 and 28 as shown and a pair of delivery conveyor supporting angle members 22' span the mid-portions of the vertically extending members 30 and the immediately adjacent end legs 18.

The longitudinally extending delivery conveyor C includes a first portion 32 for successively moving a plurality of crosswisely disposed individual packaged bread loaves $l$ in a longitudinal path to a second portion of the conveyor C, generally designated 34, which comprises the transfer station S. The conveyor section 32 preferably comprises a so-called "magic carpet" conveyor having side frame members 36 and 38, supported on the cross frame members 22' in any suitable manner, and journaling a pair of front and rear shafts 40 mounting pairs of sprockets 40a around which endless chains 44 are trained. The "magic carpet" conveyor also includes a plurality of freely rotatable rolls 43 rotatably connected between the chains. The chains 44 are intermittently driven in an endless path of travel by any suitable electric motor M (FIG. 1) which may have its output shaft connected, through suitable speed reduction gearing 45 and a chain 48, to a sprocket 42a fixed to one end of the forward shaft 40. A clutch-brake member CL such as the Horton Air Clutch model LW manufactured by Horton Manufacturing, Inc., Minneapolis, Minn., including a clutch coil CL' (FIG. 14), is provided for coupling the output of the speed reduction gearing mechanism 45 to the drive chain 48. The clutch is actuated by pressurized air supplied by an air valve such as a Mac valve (not shown) which is actuated when the clutch coil CL' is energized.

The conveyor section 34 includes a plurality of freely rotatable idler rolls 46, having reduced end portions 46a, journaled in the side frame members 36 and 38. The bread loaves l are pushed by the "magic carpet" conveyor 32 onto the idler rolls 46 with sufficient momentum so that the bread loaves positioned on the rollers 46 will move forwardly toward a stop bar member 50 extending transversely of the conveyor section 34 and pivotally mounted on a vertical pivot pin 52a provided on longitudinally movable support plate 52. An adjusting shaft 54 journaled in the frame cross members 22' may be rotated to longitudinally move the plate 52 so as to position the stop member 50 as required. The shaft 54 may have a nut and screw connection with plate 52. A loaf guide member g may also be positioned adjacent the rail 36 and preferably is laterally adjustable for guiding crosswisely disposed loaves of differing lengths.

Figure 14:
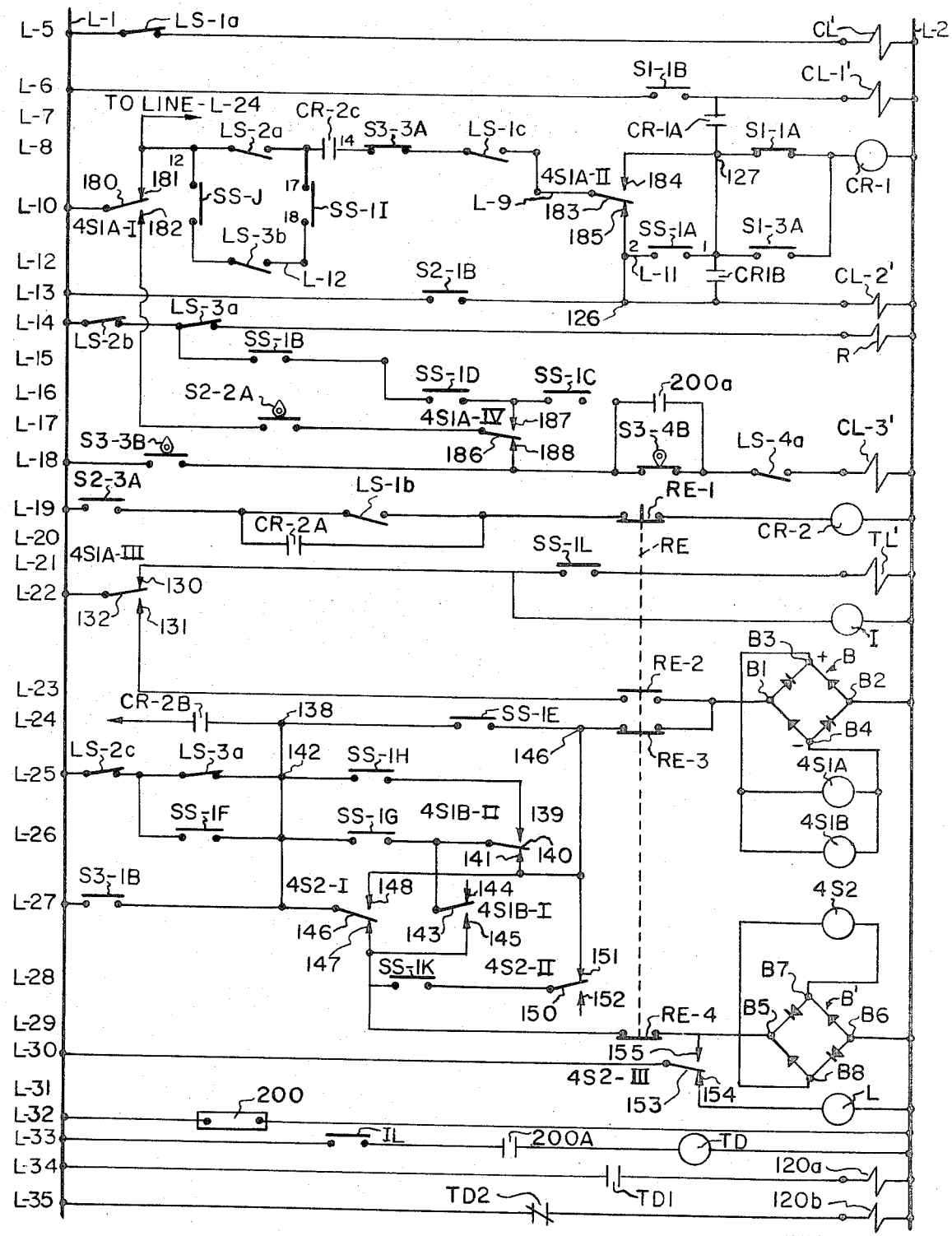
FIG. 14 is a schematic diagram of an electrical control circuit for controlling the pattern forming apparatus illustrated in FIG. 1.

The turntable T includes a circular top plate 59, which is positioned flush with the upper surface of a support plate 60 that is connected to the legs 30 and 18 and is also positioned flush with the top of the conveyor C. The turntable T is supported by a drive shaft 56 (FIG. 3) which is journaled in suitable bearings (not shown) and connected to the underside of the top plate 59. For intermittently driving the shaft 56, the output of an electric motor M-1 (FIG. 3) is connected with a suitable gear reduction unit U which is connected to the input shaft of an electrically controlled pneumatic clutch R of the character previously mentioned and including a clutch coil R' (FIG. 14). A drive chain 59a is trained around a pair of sprockets fixed to the output shaft of the clutch R and the shaft 56.

To mount the pusher assemblies P1 and P2, a pair of longitudinally extending cross braces 62 span the side frame members 22'. Positioned between the side frame members 22' is a rail 64 depending from the cross braces 62 and having bearing blocks 65 on opposite sides thereof.

Figure 30:
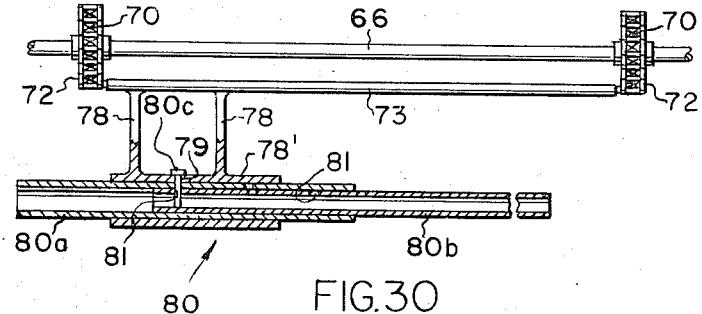
FIG. 30 is an enlarged, side elevational view particularly illustrating one of the adjustable pusher members for moving the loaves from the infeed conveyor to the turntable.

The construction of the pusher member P1, which is generally illustrated in FIG. 1, is more particularly illustrated in FIG. 30. The construction of the pusher member P2 is identical to the construction of the pusher assembly P1 and so will not be separately illustrated in detail. The pusher assemblies P1 and P2 each include a shaft 66, journaled at one end in one of the bearing blocks 65 and at its opposite end in a bearing block 68 supported on one of the cross members 22'. The shafts 66 mount pairs of spaced apart sprockets 70 which drive pairs of endless chains, schematically shown at 72, which are also trained around pairs of sprockets 74, mounted on driven shafts 76 journaled in a pair of bearing blocks (not shown) on the rail 64 and a pair of bearing blocks (not shown) on a pair of frame members 108 extending between the vertically extending posts 18 and 30. A cross bar 73 spans each pair of chains 72 and mounts a pair of support members 78 which terminate in a sleeve 78' which slidably receives a pusher bar 80 comprising a pair of telescoping tubular sections 80a and 80b. The pusher bars 80 of the pusher assemblies P1 and P2 are disposed in end-to-end relation as illustrated in FIG. 1 and are movable, on the pairs of endless chains 72, transversely of the conveyor C, to push loaves l from the coneyor C onto the turntable T. Retaining pins 80c are slidably received in suitable apertures 79 provided in the sleeve 78' and selected apertures 81 in a row thereof provided in the tubular sections 80a and 80b, for fixing the relative telescoped positions of the sections 80a and 80b. When the pins 80c are removed, the telescoping members 80a and 80b of the pusher assemblies P1 and P2 may be adjusted so that the pusher assembly P2 will, for example, individually selectively move either one, two, or three loaves and the pusher assemblies P1 and P2, when traveling together, will move a preselected number of loaves (such as five). The length of each of the pusher bars 80 is adjusted such that the ends of the bars extend slightly beyond the mid-portion, but short of the far side, of the endmost loaf l to be moved thereby.

Apparatus for driving the pair of pusher assemblies P1 and P2 in an endless path of travel comprises a motor M-3 mounted on a support plate 82 which is fixed to the upper portion of the frame F. The output shaft of the motor M-3 is connected with a suitable gear reduction unit 84 having an output shaft 85 connected with a drive transmission mechanism 86. The outer ends of a pair of output shafts 87, which are driven by the unit 86, are coonnected with electrically controlled pneumatic clutch and brake assemblies CL1 and CL2 of the character previously mentioned which connect also with shafts 87' journaled in bearing blocks 89 supported on the upper side frame members 26. The shafts 87' mount a pair of drive sprockets 90 which drive a pair of endless chains 92 trained around a pair of sprockets 93 fixed on the shafts 66. By controlling the energization and deenergization of the clutch coils CL1' and CL2' (FIG. 14) of clutch-brake mechanisms CL1 and CL2, respectively, in a manner to be later more fully described, the driving of the pusher assemblies P1 and P2, which are operable to push the loaves l from the conveyor C onto the turntable T, is selectively controlled. At their outer ends, the shafts 66 of the pusher assemblies P1 and P2 mount sprockets 94 for driving a pair of chains 95 trained around a pair of sprockets 96 fixed on the shafts 97 of a pair of Gemco cam operated switching mechanisms S1 and S2, respectively. Each of the switching mechanisms S1 and S2 is mounted atop the frame F and includes a plurality of cam operated switches which are sequentially closed and opened by a plurality of cams mounted on the shaft 97 driven by the sprockets 96 to selectively open and close the switches mounted therein in a conventional manner. The number and function of the switches in each cam operated switching mechanism S1 and S2 will be explained more particularly hereinafter during the description of the control circuit.

The pusher assembly P3, for moving the loaves *l* off the turntable T, includes bearing support members 98, extending from the vertically extending frame members 18 and 30 on opposite sides of the frame F, and supporting bearing blocks 99 journaling a pair of shafts 100, each of which mount a pair of chain drive sprockets 102. A pair of endless conveyor chains 103 are trained around the sprockets 102 and support a member 102a spanning the chains 103. A pair of support bars 104, which are each fixed at one end to the member 102a, mount, at their other ends, a pusher or sweep bar 106 for sweeping the loaves *l* from the turntable T outwardly onto the discharge plate P. When the pusher assembly P3 is driven to move loaves *l* from the turntable T to the discharge plate P, the pusher bar 106 progressively moves with the lower runs of the endlessly driven chains 103 from its starting position shown in FIG. 9 to the position shown in FIG. 1, and then moves with the upper runs of the chains 103, back to its starting position.

The gear reduction unit 84, connected with the continuously operating motor M-3, also includes another output shaft (not shown) which is in axial alignment with the shaft 85 and which is coupled with a sprocket 111, by an electrically operable pneumatic brake and clutch assembly CL3, of the type mentioned. An endless chain 112, driven in an endless path by the sprocket 111, is trained around a sprocket 113 fixed to one of the shafts 100. The other of the shafts 100 mounts a sprocket 114 at one end which drives a chain 115 trianed around a sprocket 116 which drives a third Gemco cam operated switching mechanism S3, mounted atop the frame F and including a plurality of cams for opening and closing a plurality of switches in timed relation as will more fully be described hereinafter.

The discharge plate P is pivotally movable about a shaft 118 by means of a solenoid operated, double acting, pneumatic cylinder 120, which may pivot the plate P about the shaft 118 from the solid line position shown in FIG. 1 to the dotted line position shown in FIG. 1, so that articles positioned thereon will slide in the direction of the arrow 121 onto another discharge conveyor (not shown). A reflector 124 is mounted on one corner of the plate P for reflecting a beam 126 emanating from a light source 127 toward an electric eye 200 (FIG. 14) mounted on the light beam transmitting unit 127. When bread loaves *l* are positioned on the discharge plate P so as to interrupt the beam 126, the pusher assembly P3 will be rendered inoperative by apparatus which will later be more fully described.

When the pusher P2 is operated to move a loaf *l*, which is immediately adjacent the stop 50, from the conveyor transfer station S onto the turntable T, the loaf will sometimes tend to turn. To prevent this turning, a guide bar G (FIG. 4) is pivotally mounted on the frame F, in any suitable manner, and is swung from the inoperative position shown in chain lines in FIG. 4, to the operative position shown in solid lines in FIG. 4 by a spring returned solenoid actuated pneumatic cylinder TL pivotally mounted on the frame F and including a piston rod TL1 pivotally connected with the guide bar G. When the guide bar G is moved to the full line position shown in FIG. 4, it serves as a guide for guiding the loaves moved by the pusher assembly P2. A limit switch LS-4 is mounted on the frame in any suitable manner and is actuated when the bar is in the inoperative position to close a set of normally open contacts LS-4a (see FIG. 14).

THE PATTERNS

Figure 16:
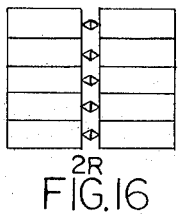
Figure 17:
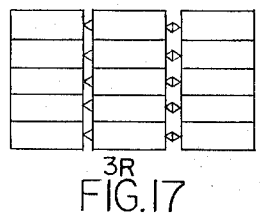

The electrical circuit, which will be described more fully hereinafter, includes a seven position pattern selector switch for selecting one pattern to be formed from at least seven different patterns, which may be formed with the apparatus, by merely moving the selector switch to a different position to selectively open and close sets of contacts SS-1A through SS-1L, depending on the particular pattern to be formed. As will be more particularly described hereinafter, the number of rows to be grouped as well as the number of products which are to be formed in the group, may be selected by changing the position of the selector switch. The sets of contacts SS-1A through SS-1L are respectively connected in lines L-11, L-15, L-16, L-16, L-24, L-26, L-26, L-25, L-12, L-12, L-28, and L-22. The sets of switches which are closed when each pattern is formed is tabulated in FIG. 14a. A first pattern which can be formed with the apparatus when the selector switch is in the first position is designated "1R" (FIG. 15) and comprises a single row of a predetermined number of loaves *l*. A second pattern which can be formed when the selector switch is in a second position, is illustrated in FIG. 16, is designated "2R", and includes two rows of a predetermined number of bagged loaves *l* positioned with the tails *t* facing each other. A third pattern which can be formed when the selector switch is in a third position is illustrated in FIG. 17, is designated "3R", and is comprised of three rows of a predetermined number of loaves *l*, with two of the rows being grouped identically to the rows of loaves shown in FIG. 16 and a third row of bread loaves *l* being positioned against the second row of the loaves such that the tails *t* of the third row are in abutting relation with the heads of the loaves of the second row. A fourth pattern which can be formed when the selector switch is in a fourth position is designated "1R1" and comprises one row of a predetermined number of loaves *l* and a row comprising one loaf positioned crosswisely to the loaves in the first row and with the tails of the loaves in the first row in abutting relation with the crosswisely extending loaf, as shown in FIG. 18.

Figure 18:
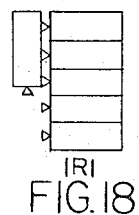
Figure 19:
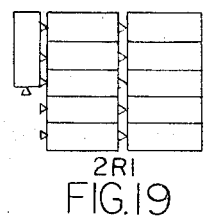

A fifth pattern which can be formed when the selector switch is moved to a fifth position is designated "2R1" in FIG. 19 and comprises two rows of a predetermined number of loaves *l* positioned identically to the two rows of loaves illustrated in FIG. 18 and a third row consisting of one loaf extending crosswisely to the loaves in the first two rows.

Figure 20:
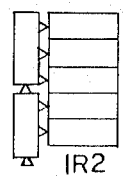

A sixth pattern which can be formed when the selector switch is moved to a sixth position is designated "1R2" in FIG. 20 and comprises one row of a predetermined number of loaves *l* and one row having two loaves extending crosswisely to the loaves in the first row and positioned so that the tails *t* of the loaves of the first row are in abutting relation with sides of the loaves of the second row.

Figure 21:
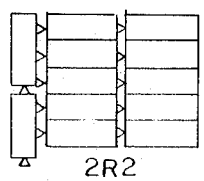

A seventh pattern which can be formed when the selector switch is moved to a seventh position is designated "2R2" in FIG. 20 and comprises two rows of a predetermined number of loaves *l* positioned identically to the loaves illustrated in FIG. 21, with the addition of one row comprising two loaves which extend crosswisely of the loaves in the two rows.

As will be more particularly described hereinafter, by adjusting the relative positions of the tubular sections 80a and 80b of each of the pusher assemblies P1 and P2, there are an additional eight patterns, as illustrated in FIGS. 22 – 29, which can be formed with the apparatus. By adjusting the telescoping sections 80a and 80b of pusher assembly P2 to double the length of the pusher bar 80 of the pusher assembly P2 so that it will sweep two loaves, and decreasing the length of the pusher bar 80 of the pusher assembly P2 by telescoping its sections 80a and 80b a like amount, so that the pusher assemblies P1 and P2, when moving together will continue to move five loaves, the patterns illustrated in FIGS. 22, 23, 26 and 27 may be formed. By still further increasing and decreasing the lengths of the pusher bars 80 of the respective pusher assemblies P1 and P2, so that the pusher P2 will sweep three loaves and the combined pushers P1 and P2 will sweep five loaves, the patterns illustrated in FIGS. 24, 25, 28 and 29 will be formed.

Figure 22:
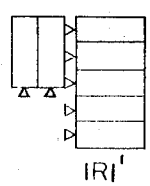
Figure 24:
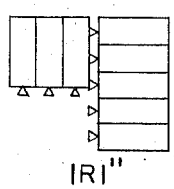

The patterns illustrated in FIGS. 22 and 24 are designated 1R1' and 1R1'' respectively and are generally similar to the configuration illustrated in FIG. 18, except that there are two and three rows, respectively, consisting of side-by-side loaves extending crosswisely of the first row.

Figure 26:
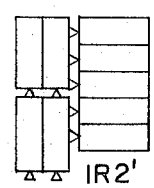
Figure 28:
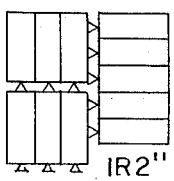

The patterns illustrated in FIGS. 26 and 28 are designated 1R2' and 1R2'', respectively, and are generally similar to the configuration illustrated in FIG. 20 except that there are two and three rows, respectively of side-by-side loaves extending crosswisely of the loaves in the first two rows.

Figure 23:
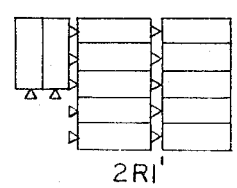
Figure 25:
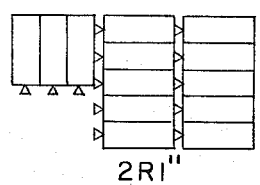

The patterns illustrated in FIGS. 23 and 25 are designated 2R1' and 2R1'' and are generally similar to the configuration illustrated in FIG. 19 except that there are two and three rows consisting, respectively, of side-by-side loaves extending crosswisely of the loaves in the first two rows.

Figure 27:
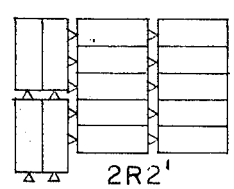
Figure 29:
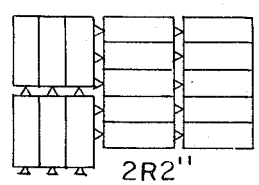

The patterns illustrated in FIGS. 27 and 29 are generally similar to the pattern illustrated in FIG. 21 except that there are two and three rows, respectively, of side-by-side loaves extending crosswisely of the loaves in the first two rows.

THE CONTROL CIRCUIT

Referring now more particularly to FIG. 14, a control circuit is illustrated and includes a pair of lines L-1 and L-2 connected across a suitable source of power, such as 110 volt, 60 cycle, alternating current. A plurality of circuit and sub-circuit lines, designated L-5 through L-35, are connected across the lines L-1 and L-2. A limit switch LS-1, which is mounted on the support plate 52 in the path of the swingable stop bar 50, is actuated when the stop bar 50 comes in contact therewith to open a set of normally closed contacts LS-1a in line L-5 and close sets of normally open contacts LS-1b and LS-1c in lines L-19 and L-8 respectively. The limit switch LS-1 is of the type that will maintain the contacts LS-1a closed until sufficient pressure is exerted thereon by a predetermined number of loaves, for example five, which have gathered at the transfer station S to bear against the stop 50. The position and pressure setting of the limit switch LS-1 determines the maximum number of loaves which can be simultaneously transferred by the pusher assemblies P1 and P2 in forming a selected pattern. The limit switch contacts LS-1a (line L-5) are connected in series circuit relation with the clutch coil CL', of the infeed conveyor clutch CL, which, when energized, is operable to connect the output of the gear reduction unit 46 with the drive chain 48 for driving the power drive rolls 40 of the conveyor C. The normally open limit switch contacts LS-1b (line L-19) and LS-1c (line L-8) are closed when the limit switch LS-1 is actuated. The clutch coils for energizing the first, second, and third pusher clutches CL1, CL2 and CL3, respectively, are shown at CL-1', CL-2' and CL-3', in lines L-6, L-13, and L-18 respectively.

When the clutch coil CL-1' of the clutch CL1 is energized to drive the pusher assembly P1, the Gemco cam operated switching mechanism S1 is driven to open and close a plurality of switching members S1-1A, S1-1B and S1-3A connected in lines L-8, L-6, and L-11 respectively.

When the clutch coil CL-2' of the clutch CL2 is energized so as to drive the pusher assembly P2, the Gemco cam operated switching mechanism S2 is driven to sequentially open and close a plurality of switching contacts S2-1B, S2-2A, and S2-3A connected in lines L-13, L-17 and L-19 respectively.

When the clutch coil CL-3' of the clutch CL3 is energized to drive the pusher assembly P3, the Gemco cam operated switching mechanism S3 is driven to sequentially open and close sets of contacts S3-1B, S3-3A, S3-3B, and S3-4B connected in lines L-27, L-8, L-18 and L-18 respectively. The time phase sequence in which the cam operated switching contacts of the three Gemco switching mechanisms S1, S2 and S3 are closed and opened is schematically illustrated in FIG. 14b, the solid lines being representative of closed contacts and the arrows FR1, FR2 and FR3 being schematically representative of the pusher assemblies P1, P2 and P3 moving through one complete cycle.

The normally open cam operated holding contacts S1-1B (line L-6), which are closed shortly after the pusher assembly P1 moves to sweep articles from the conveyor C to the turntable T, are connected in series with the clutch coil CL-1' of the clutch CL1, for maintaining the clutch coil CL1 energized to drive the pusher assembly P1 until it returns to its starting position.

Three multiple cam stepping relays 4S1A, 4S1B and 4S2, such as type 200 manufactured by C. P. Clare Company of Chicago, Ill., are connected in circuit in lines L-25, L-26, and L-27 respectively. Each of the stepping relays is a four step, or multiple of four step, relay of the type which must be energized and then de-energized prior to stepping the cams associated therewith. The control functions are repeated every two steps for the one row pattern and every four steps for all other patterns. The stepping relay 4S1A includes four sets of cam operated switching mechanisms 4S1A-I, 4S1A-II, 4S1A-III and 4S1A-IV connected in lines L-10, L-10, L-22, and L-17 respectively. The stepping relay 4S1B includes two sets of cam operated switching mechanisms 4S1B-I and 4S1B-II connected in lines L-27 and L-26. The stepping relay 4S2 includes three sets of cam operated switching mechanisms 4S2-I, 4S2-II, and 4S2-III in lines L-27, L-28 and L-30 respectively. The tabulation provided in FIG. 14c graphically illustrates the contact closure for each of cam operated switching members for each of the relays 4S1A, 4S1B, and 4S2. An "X" designates which of the cam operated switching mechanisms are in the position shown in FIG.

14, in each of the four steps. As will be explained later, the relays 4S1A and 4S1B step simultaneously, whereas sometimes the relay 4S2 will step ahead of the relays 4S1A and 4S2A.

The normally open set of contacts LS-1B (line L-19), of the limit switch LS-1, is connected in series circuit with the set of contacts S2-3A, a set of reset contacts RE-1 of a reset switch RE, and a holding relay CR-2. The relay CR-2 includes sets of normally open contacts CR-2A, CR-2B, and CR-2C, connected in lines L-20, L-24 and L-8, respectively, which are closed when the relay CR-2 is energized. The set of holding contacts CR-2A is connected in parallel with the set of limit switch contacts LS-1b. The manually operable reset switch RE also includes sets of normally open contacts RE-2 (line L-23) and normally closed contacts RE-3 (line L-24) which are closed and opened respectively when the reset switch RE is manually actuated.

As will be more particularly described hereinafter, substantially all of the logic circuitry for determining the sequence in which the circuit elements will function is connected in the circuit lines L-19 through L-30 with the circuitry connected in lines L-19, L-25, and L-27 particularly providing the stepping pulses for stepping the relays 4S1A, 4S1B, and 4S2 in sequence. In line L-10, the switching mechanism 4S1A-1 is shown in the position which it assumes during steps one and four and includes a movable switch arm 180 and two fixed contacts 181 and 182. When the arm 180 engages the fixed contact 181, the circuit is complete from the line L-1, through the line L-7, to the line L-24 which includes a set of normally open contacts CR-2B of the holding relay CR-2, the set of selector switching contacts SS-1E, the reset contacts RE-3, and the input terminals B1 and B2 of a full wave rectifying bridge circuit B. The output terminals B3 and B4 of the bridge circuit B are connected across the armatures of the stepping relays 4S1A and 4S1B.

Positioned at 90 degree intervals about the turntable drive shaft 56 is a pair of limit switches LS-2 and LS-3 (FIG. 3) which are actuated by either of a pair of radially extending members 56a and 56b on the shaft 56. The limit switch LS-2 includes a set of normally open contacts LS-2a (line L-8) and sets of normally closed contacts LS-2b (line L-14), and LS-2c (line L-25), which are closed and opened respectively when the limit switch LS-2 is actuated. The limit switch LS-3 includes sets of normally closed contacts LS-3a (line L-14 and LS-3c) and normally open contacts LS-3b (line L-12) which are opened and closed respectively when the limit switch LS-3 is actuated by the members 56a and 56b. In FIG. 3, the member 56b is shown in an actuating position in engagement with the limit switch LS-2. As will be described more fully hereinafter, by positioning the limit switches LS-2 and LS-3 at 90° intervals and the members 56a and 56b at 180° intervals, one of the limit switches LS-2 and LS-3 will be actuated after each 90° rotation of the shaft 56 to interrupt rotation of the turntable T unless the limit switch contacts LS-3a are by-passed in a manner also to be described later.

Connected in circuit line L-8 between the fixed contact 181 and the line L-2 is the circuit for actuating either individually or simultaneously, depending on the pattern selected, the clutch coils CL-1' and CL-2' of the pusher assemblies P1 and P2, and includes the set of normally open contacts LS-2a, the relay contacts CR-2C, the normally open limit switch con-tacts LS-1c, the switching mechanism 4S1A-II, (line L-9), the initially closed set of cam operated switching contacts S1-1A, and a holding relay CR-1. When the relay CR-1 is energized, the normally open sets of contacts CR-1A and CR-1B connected to junction 127, in line L-8, are closed to simultaneously energize the clutch coils CL-1' and CL-2' to simultaneously connect the output of the motor M-3 with the pusher assemblies P1 and P2. The stepping relay switching mechanism 4S1A-II includes a switch arm 183 movable into engagement with a pair of fixed contacts 184 and 185. The arm 183 is in engagement with the contacts 185, when the relay 4S1A is in steps one and four, and in engagement with the contact 184 when the relay 4S1A is in steps two and three. Connected in parallel with the limit switch contacts LS-2a is a series circuit comprising the contacts SS-1J, the normally open limit switch contact LS-3b in line L-12, and the contacts SS-1I. To cycle the pusher assemblies P1 and P2, either the limit switch contacts LS-2a or LS-3b must initially be closed to energize at least one of the clutch coils CL-1' and CL-2'.

When the switching mechanism 4S1A-II is in the position shown in the drawing, the circuit is set to apply power to the junction 126 (line L-13) to energize the sweep clutch CL-2' for driving the pusher assembly P2. When the switching mechanism 4S1A-II is moved to the opposite position, so that the arm 183 engages the fixed contact 184, the holding relay CR-1 is energized to close the normally open sets of holding contacts CR-1A and CR-1B connected between the junction 127 and the clutch coils CL-1' and CL-2'. The holding contacts S2-1B (line L-13) are connected between the line L-1 and the junction 126 and are closed shortly after the pusher assembly P2 is driven to maintain the clutch coil CL-2' energized for a predetermined time, after which time the contacts S2-1B are cammed open to stop movement of the pusher assembly P2. The set of selector switching contacts SS-1A (line L-11) are connected between the junction 126 and the junction 127 and, when in the closed position, energize the relay CR-1 at the same time that the clutch coil CL-2' is energized even though the arm 183 (line L-10) engages the fixed contact 185. The set of cam operated contacts S1-3A (line L-11), connected between the junction 127 and the holding relay CR-1, close after the pusher assembly P1 is moved a slight distance and serve as holding contacts to hold the relay CR-1 energized for a short time after the set of contacts S1-1A "drop out" to prevent a momentary loss of the circuit.

The clutch coil for energizing the rotator clutch R to selectively connect the motor M-1 with the turntable T is shown at R' (line L-15) connected in series circuit relation with the sets of normally closed contacts LS-2b and LS-3a. The set of selector switch contacts SS-1B are connected in parallel with the limit switch contacts LS-3a, and are moved to the closed position when the loaves on the turntable T are to be rotated 180°. The contacts SS-1B, when closed, function to keep the rotator clutch coil R' energized by by-passing the limit switch contacts LS-3A which are opened when the turntable T is rotated 90° and the member 56a engages the limit switch LS-3. The limit switch LS-2 functions to stop the turntable after it has been rotated 180°, for patterns illustrated in FIGS. 16 and 17, and limit switches LS-2 and LS-3 function to stop the turntable every 90° for patterns 18 – 29. The cam operated switching contacts S2-2A (line L-17) are connected to the fixed contact 182 (line L-9) and are initially closed to permit energization of the rotator coil R but subsequently opened when the pusher assembly P2 is driven. The switching mechanism 4S1A-IV includes a switch arm 186 selectively movable into engagement with sets of fixed contacts 187 and 188. The arm 186 of the stepping mechanism 4S1A-IV is also connected in series with the cam operated switch contacts S2-2A. The arm 186 will engage the fixed contact 188 when the relay 4S1A is in steps one and four and the contact 187 in the other two steps.

To energize the rotator clutch coil R', the contacts 4S1A-I and 4S1A-IV are moved to positions opposite to that shown in the drawings so that the arms 180 and 186 engage the contacts 182 and 187 respectively, to complete the circuit from the arm 180 in line L-10 through the contacts S2-2A, which are closed when the pusher P2 starts moving, the switching mechanism 4S1A-IV, and the selector switch contacts SS-1D.

When the switching mechanism 4S1A-IV is in the position shown in the drawing, the circuit from the arm 180 in line L-9 is completed through the initially closed selector switch contacts S3-4B, the normally open limit switch contacts LS-4a of the limit switch LS-4, and the clutch coil CL-3' (line L-18) which, when energized, drives the third pusher assembly P3. After the pusher assembly P3 has been driven a slight distance, the holding contacts S3-3B will be closed and the contacts S3-4B will be opened. The photo electric eye 200, mounted adjacent the discharge plate P, is connected in line L-32 and includes a set of normally open contacts 200a, in line L-16, which are closed when the eye is unblocked and the beam 126 is transmitted without interruption to bypass the contacts S3-4B. If the contacts 200a are opened, when the contacts S3-4B open, the pusher assembly P3 will dwell until the bread loaves *l* clear the discharge plate P and the contacts 200a close. The set of contacts S3-4B will remain closed until the pusher assembly P3 returns to its starting position after which time it is opened. The set of selector switching contacts SS-1C is connected between the selector switch contacts SS-1D and the contacts 200a in line L-16.

The switching mechanism 4S1A-III (line L-22) includes a movable switch arm 132, connected in line L-22, movable into engagement with either of a pair of stationary contacts 130 and 131. When the arm 132 is in engagement with the contact 130, the solenoid TL' in line L-21 for actuating the loaf guide cylinder TL is energized if the selector switching contacts SS-1L are closed to move the loaf guide G from the inoperative position shown in chain lines in FIG. 4 to the operative position shown in solid lines in FIG. 4. An indicator lamp I is connected across the solenoid TL' in line L-22 for visually indicating the position of the guide G. The arm 132 is in engagement with the fixed contact 130 when the relay 4S1A is in step one and is in engagement with the fixed contact 131 when the relay 4S1A is in steps two, three and four. When the arm 132 engages the fixed contact 131 and the reset contacts RE2 are closed, the circuit is complete from the line L-1 through the input terminals B1 and B2 of the rectifying bridge circuit B.

The switching circuitry in lines L-25 through L-30 is provided for selectively directing the stepping signals to the appropriate relays 4S1A, 4S1B and 4S2. The switching mechanism 4S1B-II (line L-26) includes a movable switch arm 143 selectively movable into engagement with either of a pair of fixed contacts 139 and 140. In line L-25, the sets of normally closed limit switch contacts LS-2c and LS-3b are connected in circuit with the contacts SS-1H and the fixed contact 139. In line L-26, the arm 140 is connected with the cam operated contacts SS-1G which are connected to the junction 142 between the limit switch contacts LS-3c and the cam operated contacts SS-1H. The cam operated contacts SS-1F in line L-26 are connected in parallel with the normally closed contacts LS-3a. The fixed contact 141 is connected to the junction 146a (line L-24) between the contacts SS-1E and the reset contacts RE-3.

The switching mechanism 4S1B-I includes a switch arm 143 in line L-27 movable into engagement with either of a pair of fixed contacts 144 and 145, the contact 144 being a "dead" contact. The movable arm 140 is connected with the movable arm 143.

The movable arm 143 is in the position shown in FIG. 14 when the relay 4S1B is in steps one and three, and in the opposite position in engagement with the contact 145 when the relay 4S1B is in steps two and four.

The switching mechanism 4S2-I in line L-27 includes a switch arm 146 movable into engagement with either of a pair of fixed contacts 147 and 148. In FIG. 14, the movable arm 146 is shown in engagement with the fixed contact 147, which is connected with the fixed contact 145 of the stepping mechanism 4S1B-I in line L-27. The other fixed contact 148 of the switching mechanism 4S2-I is connected with the fixed contact 141, of the switching mechanism 4S1B-II, in line L-26 and the junction 146a in line L-24. When the relay 4S2 is in steps one and three, the arm 146 is in the position shown in the drawing. When the stepping relay 4S2 is in steps two and four, the arm 146 is in the opposite position, in engagement with the fixed contact 148. The set of cam operated contacts S3-1B (line L-27), connected between the movable arm 146 and the line L-1, is normally open when the pusher assembly P3 is in its initial starting position and is closed after the pusher assembly P3 starts moving through its cycle to selectively energize the stepping relays 4S1A, 4S1B and 4S2, depending upon the positions of the various switches in the lines L-25 through L-30. As schematically illustrated in FIG. 14b, the set of contacts S3-1B open before the pusher assembly P3 stops and thus provides at least one of the deenergizing stepping pulses for the relays 4S1A, 4S1B and 4S2.

The switching mechanism 4S2-II (line L-28) includes an arm 150 movable into engagement with a pair of fixed contacts 151 and 152. The contact 152 is a dead contact which is engaged by the movable arm 150 when the stepping relay 4S2 is in steps one and four, whereas the fixed contact 151 is engaged by the movable arm 150 when the relay 4S2 is in steps two and three. The fixed contact 151 is connected with the junction 146a in line L-24. The fixed contact 147 is connected to the set of switching contacts SS-1K (line L-28), which is also connected with the movable arm 150, and is also connected with a normally closed set of reset contacts RE-4 in line L-29. The input terminals B5 and B6 of a bridge B', in line L-29, are connected between the reset contacts RE-4 and the line L-2. The output terminals B7 and B8 of the bridge B' are connected across the armature of the stepping relay 4S2.

The switching mechanism 4S2-III in line L-30 includes a movable switch 153 connected to line L-1 and in engagement with a fixed contact 154 in step one and movable into engagement with a fixed contact 155 in steps two, three and four. A light L is also connected between the contact 154 and the line L-2 in the normal manner. The contact 155 is connected to the terminal B-5 of the bridge circuit B.

The photo electric eye 200, connected across lines L-1 and L-2 in line L-32 also includes a set of normally closed contacts 200b (line L-33) which are open when the beam 126 emanating from the photoelectric eye 127 on the discharge platform P in interrupted.

An accumulating conveyor (not shown) is disposed below the discharge plate P for receiving articles from the discharge plate P and includes an interlock switch IL connected in line L-33 in series with the normally closed contacts 200b, and a timer relay TD, which determines the length of time the tilt tray remains down for depositiong bread loaves on the accumulating conveyor. The timer includes sets of normally open contacts TD1 (line L-34) and normally closed contacts TD2 (line L-35) which close and open respectively when the timer TD times out. The contacts TD1 are connected in series with the solenoid 120a of the tilt tray cylinder 120 for moving the tilt tray P from the solid line position shown in FIG. 1 to the chain line position shown in FIG. 1. The contacts TD2 are connected in series with the solenoid 120b of the tilt tray cylinder 120 for returning the tile tray P to the solid line position.

THE OPERATION

The operation will be described with particular reference to FIGS. 2 - 14, which illustrate the sequential steps in the formation of a typical (2R2) pattern, illustrated in FIG. 21, comprising two rows of five loaves each and one row with two loaves oriented crosswisely to the loaves in the other two rows. The selector switch will be moved to position "7" (FIG. 14a) to form the "2R2" pattern and, as illustrated in FIG. 14a, the contacts SS-1D, SS-1H, SS-1I, SS-1J and SS-1L are thus closed. The limit switch control bar and stop member 50 is positioned such that five loaves will be positioned at the transfer station S when the limit switch LS-1 is actuated. The loaf guard G is adjusted on the frame F to allow approximately one inch space between the guard G and a loaf which is to be moved by the pusher assembly P2 when the guard G is in the solid line position in FIG. 3.

The telescoping members 80a and 80b of the pusher rods 80 on the pusher assemblies P1 and P2 are manually adjusted so that only five loaves will be transferred to the turntable when both pusher assemblies P1 and P2 operate in unison, and when the pusher P2 operates individually, only one loaf is transferred to the turntable T. With the lines L-1 and L-2 connected to the source of power, the loaf guide solenoid TL' (line L-21) will be energized through the now closed selector switch contacts SS-1L to move the loaf guide G into the solid line position shown in FIG. 4. At this time, as illustrated in FIG. 14b, the cam operated switch contacts S1-1A, S2-3A, S3-3A and S3-4B are closed. The conveyor clutch CL' (line L-5), is energized through the closed limit switch contacts LS-1a. When five loaves are conveyed to the transfer section S, the arm 50 will actuate the limit switch LS-1 and open the normally closed contacts LS-1a to deenergize the conveyor clutch CL', thereby stopping the infeed conveyor C, and to close the normally open sets of contacts LS-1 c (line L-8) and LS-1b (line L-19) to energize the holding relay CR-2. When the relay CR-2 is energized, the contacts CR-2C in line L-8 close to complete the circuit from the line L-1, through the arm 180 and fixed contact 181 of the stepping mechanism 4S1A-I (line L-10), the limit switch contacts LS-2a, which are in the closed position because of the turntable cam member 56a engaging the limit switch LS-2, the closed contacts CR-2 and S3-3A, the closed limit switch contacts LS-1c, the switch arm 183 and contact 85, the junction 126, and finally the clutch coil CL-2' in line L-13. When the clutch coil CL-2' is energized, the clutch CL-2 couples the output of the motor M-3 with the pusher assembly P2 to drive the pusher bar 80 of the assembly P2 so as to transfer a single loaf from the conveyor C onto the turntable T. At this time, the stepping relay 4S2 is energized through the closed contacts CR-2B (line L-24), the arm 146 and fixed contact 147 (line L-27), the reset contacts RE-4, and the bridge circuit B'. As the pusher assembly P2 is operated to move the loaf beyond the stop bar 50, the limit switch LS-1 is deactivated and the set of contacts LS-1b in line L-19 is opened. Also, as the pusher assembly P2 is operated the Gemco cam switching member S2 is driven and the initially closed contacts S2-3A (line L-19) open so that the relay CR-2 falls out and opens the contacts CR-2B in line L-24 to provide the deenergizing stepping signal through the arm 146 and contact 147 of the stepping contacts 4S2-I and the bridge B' to step the relay 4S2 to the second step. At this time, there is no path for a stepping pulse to energize the relays 4S1A and 4S1B which remain in step one. As the Gemco switching member S2 is driven, the holding contacts S2-1B in line L-13 are closed to hold the clutch coil CL-2' energized to return the pusher assembly P2 to its original starting position.

When the first loaf ll is moved from the conveyor C to the turntable T (FIG. 3) to deactivate the limit switch LS-1, the contacts LS-1a (line L-5) again close to operate the conveyor clutch CL' to drive the infeed conveyor C. When another loaf l6 has been moved to the transfer station S so that enough pressure is exerted on the bar 50 to again actuate the limit switch LS-1, the contacts LS-1a open and the contacts LS-1b and LS-1c close to permit the pusher assembly P2 to continue through its cycle a second time to move a second loaf l2 lengthwisely onto the turntable T to the position shown in FIG. 5. When the limit switch contacts LS-1b and contacts S2-3A open for the second time as the pusher assembly P2 moves the second loaf to the position shown in FIG. 5, the relay CR-2 is again deenergized to open the contacts CR-2A (line L-20), CR-2B (line L-24), and CR-2C (line L-8). Because the switching arms 146 and 150, in step 2, of the stepping mechanisms 4S2-I (line L-27) and 4S2-II (line L-28) have been stepped to the position opposite to that shown in the drawings, there is no closed circuit between the contacts CR-2B and the relay 4S2 for providing a deenergizing stepping pulse to the relay 4S2. However, because the arm 146 of the stepping contacts 4S2-I (line L-27) is now in engagement with the fixed contact 148, there is a path from the junction 138 (line L-24) through the contacts 4S2-I, the junction 146, the closed reset contacts RE-3, the bridge circuit B, to the arm of stepping relays 4S1A (line L-25) and 4S1B (line L-26) so that the relays 4S1A and 4S1B are stepped to the second step when the second loaf is delivered to the table T. With the stepping relays 4S1A and 4S1B in step two, the arms of the stepping contacts 4S1A-I (line L-10), 4S1A-II (line L-9), 4S1A-III (line L-22), and 4S1A-IV (line L-17), in addition to the arms of the switching mechanism 4S1B-I (line L-27) and 4S1B-II (line L-26) will all be moved to positions opposite to that shown in FIG. 14.

As the second loaf l2 is removed from the transfer station S to the turntable T, the limit switch LS-1 is again deactuated to close the contacts LS-1a in line L-5 and actuate the conveyor clutch CL' to drive the conveyor C which moves another loaf l into the transfer station S. With five loaves present at the transfer station S, the bar 50 again actuates the limit switch LS-1 to interrupt the conveyor C and energize the relay CR-2 to close the contacts CR-2A, CR-2B and CR-2C. With the arm 180 of the switching mechanism 4S1A-I (line L-10) in the position opposite shown in the drawing, the clutch coil CL-2' is deenergized and the pusher assembly P2 is not driven. However, a circuit is completed from the line L-2 through the arm 180 and fixed contact 182, the contacts S2-2A (line L-17) which are now cammed closed, the arm 186 and fixed contact 187 of the switch contacts 4S1A-IV (line L-17), and the closed selector switching contacts SS-1D (line L-16) to the rotator clutch coil R' (line L-15). When the switching arm 132 of the switching mechanism is in the position opposite that shown in the drawing, the loaf guide control solenoid TL' is deenergized to permit the loaf guide G to be retracted to the inoperative position illustrated in chain lines. When the rotator clutch coil R' is energized, the clutch R (FIG. 3) couples the output of the motor M-1 to the shaft 56 to rotate the turntable T, in the direction of the arrow v shown in FIG. 6, so that the two loaves l1 and l2 positioned thereon are moved 90° to the position shown in FIG. 7. During the rotation, the relays 4S1A and 4S1B are energized through the closed contacts LS-2c and LS-3a in line L-25, the arm 146 (line L-27) and fixed contact 148. As the loaf l2 moves away from the bar 50 to again close the limit switch contacts LS-1a, the conveyor C will be driven to deliver loaf l7 to the transfer station S. The stepping relay 4S2 is also energized through the limit switch contacts LS-2c and LS-3c and the fixed contact 145 (line L-27) and the arm 143 of the switching mechanism 4S1B-I, the arm 140 and fixed contact 139 of the switching contacts 4S1B-II (line L-26) and the closed switching contact SS-1H in line L-25. When the turntable T has been rotated 90°, the limit switch LS-3 is actuated to open the contacts LS-3a to deenergize the rotating clutch coil R' and open the contacts LS-3b to provide a deenergizing stepping pulse to the stepping relays 4S1A and 4S1B through the path provided by the arm 146 and fixed contact 148 of the switching contacts 4S2-I. The deenergizing stepping pulse is also coupled to the relay 4S2 through the switching mechanisms 4S1B-II and 4S1B-I. Thus, the stepping relays 4S1A, 4S1B and 4S2 are each moved to step three. In step three, the arms of the switching mechanisms 4S1A-I, 4S1B-I, 4S2-I and 4S2-II return to the positions shown in FIG. 14, whereas the arms of the switching mechanism 4S1A-II, 4S1A-III, 4S1A-IV and 4S1B-II remain in positions opposite to that shown in the drawing. A current path is now provided through the arm 183 of the switching mechanism 4S1A-II (line L-9), through the contacts S1-1A to energize the relay CR-1 and close the contacts CR-1A and CR-1B. When the contacts CR-1A and CR-1B close, the clutch coils CL1' and CL2' are both energized to simultaneously drive the pusher assemblies P1 and P2 and move five additional loaves l3 – l7, from the transfer station S onto the turntable T, as shown in FIGS. 7 and 8, into abutting relation with the first two loaves l1 and l2 so that the tails of the loaves l3 – l7 are nested tightly against the loaves l1 and l2. As the five bread loaves l3 – l7 are simultaneously moved from the stop bar 50, the limit switch contacts LS-1b and the holding contacts S2-3a open to deenergize the relay CR-2 and again open the contacts CR-2B which provide a deenergizing signal to the relay 4S2 through the switching mechanism 4S2-I (line L-27) and the reset contacts RE-4. There is no current path for a deenergizing pulse to step the relays 4S1A and 4S1B. When the contacts LS-1b are opened, the relay 4S2 is thus stepped to step four while the relays 4S1A and 4S1B remain in step three which sets up the circuit so that the simultaneous operation of the pusher assemblies P1 and P2 may be repeated. When five more loaves l8 – l12 are conveyed into the transfer station S, the limit switch LS-1 is again actuated to reenergize the relay CR-2 and close the set of contacts CR-2C (line L-8). The relay CR-1 and the clutch coils CL1' and CL2' are energized, in the same manner previously described, to simultaneously drive the pusher assemblies P1 and P2 to move the second row of five loaves l8 – l12 onto the turntable T as shown in FIG. 9. When the second row of five loaves is removed from the conveyor C to open the limit switch contacts LS-1a and the contacts S2-3A open, no deenergizing stepping pulse (from contacts CR-2B) is permitted to reach the relay 4S2 in that the arm 146 (line L-27) is in engagement with the contact 148, however, relays 4S1A and 4S1B are both stepped to the fourth step by the deenergizing pulse passing through the arm 146 and contact 148 of the switching mechanism 4S2-1. With the relays 4S1A and 4S1B in the fourth step, the switch arms of the switching mechanisms 4S1A-I, 4S1A-III and 4S1B-I, are in positions opposite that shown in the drawing. A current path is thus provided from the line L-2 through the switching mechanism 4S1A-I in line L-10, the contacts S2-2A (line L-17), the switching mechanism 4S1A-IV, the closed contacts S3-4B in line L-18, the closed contacts LS-4A of the limit switch LS-4 and the clutch coil CL-3' of the sweep pusher P3 to drive the pusher assembly P3 to move the array of loaves l1 – l12 positioned on the turntable T in the direction of the arrow x shown in FIG. 10 onto the discharge plate P, providing the photoelectric eye 200 is not blocked. With the eye 200 not blocked, the contacts 200a close and maintain circuit continuity around the contacts S3-4B (line L-18) which open shortly after the pusher assembly P3 starts moving. The holding contacts S3-3B (line L-18) close to assure that the loaves are swept onto the discharge plate P and are again opened when the pusher assembly P3 returns to its starting position. When the pusher assembly P3 is returned to its "start" position, the cam operated contacts S3-1B in line 27 open to provide the stepping pulse to step the relays 4S2 and 4S1A and 4S1B to the starting position so that the operation may be repeated.

Figure 15:
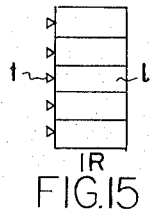
FIGS. 15 – 29 are schematic diagrams illustrating typical patterns which may be selectively formed with the apparatus illustrated in FIGS. 1 – 14.

In the formation of the "IR" pattern illustrated in FIG. 15, the selector switch is moved to position "1"

(FIG. 14a) and the contacts SS-1A, SS-1C, SS-1E, SS-1I, and SS-1J are closed. The infeed conveyor C delivers packaged bread loaves to the transfer station S until the limit switch LS-1 is actuated to stop the conveyor. The sweep clutches CL-1' and CL-2', in lines L-6 and L-13, are energized to drive the pusher assemblies P1 and P2 which operate together to sweep five loaves off the transfer staion S onto the turntable T. When the limit switch LS-1 is released, the conveyor C again starts and the relays 4S1A and 4S1B are stepped to the second step. Because the switch SS-1D in line L-16 is open, the clutch coil R' in line L-15 is not energized and there is no rotation of the turntable T, however, the clutch CL-3' is energized through the closed contacts SS-1C in line L-16 to drive the pusher P3 which moves the five loaves to the discharge plate P. When the pusher P3 reaches the end of its sweep cycle, the relays 4S1A and 4S1B are stepped to the third step. The limit switch LS-1 is again actuated as a full complement of bread loaves are moved into the transfer station S and the conveyor C stops. The pusher assemblies P1 and P2 again cycle together to move another row of five loaves to the turntable T thereby releasing the limit switch LS-1 to start the conveyor C and step the relays 4S1A and 4S1B to the fourth step. At this time, the circuit is again complete through the closed contacts SS-1C in line L-16, to energize the clutch coil CL-3' in line L-18 to drive the pusher assembly P3, which moves the other row of five loaves off the turntable T. At the end of the cycle of the pusher assembly P3, the relays 4S1A and 4S1B step to the fifth step so that the cycle is repeated. In the formation of this pattern, the relay 4S2 is not used to cause any function to be repeated.

In the formation of the "2R" pattern illustrated in FIG. 16, the selector switch is moved to position "2" (FIG. 14a) and the limit switch contacts SS-1A, SS-1B, SS-1D, SS-1E, SS-1F, and SS-1J are closed. When the limit switch LS-1 is actuated, the conveyor C stops and the pusher assemblies P1 and P2 cycle to collectively push five loaves from the conveyor C onto the turntable T to release the limit switch LS-1 to again start the conveyor. When the limit switch contacts LS-1a are opened to deenergize the relay CR-2, the relays 4S1A and 4S1B are stepped to the second step. The rotator clutch coil R' in line L-15 is energized through the contacts SS-1B, the limit switch contacts LS-2b, and the closed contacts SS-1D in line L-16 to rotate the turntable T 180°. When the limit switch LS-2 is actuated to open the contacts LS-2a, the rotator stops. When the contacts LS-2c in line L-25 open, the relays 4S1A and 4S1B are stepped to the third step. The conveyor C is again operated to bring bread loaves to the transfer station S to actuate the limit switch LS-1 to stop the conveyor C and cycle the pusher assemblies P1 and P2 which deliver a second row of five loaves onto the turntable T so that the tails of the loaves in the two rows are in abutting relation. When the limit switch LS-1 is released, the conveyor C again starts and the relays 4S1A and 4S1B are stepped to the fourth step. At this time, the clutch coil CL-3' is energized to cycle the pusher assembly P3, which sweeps the two rows onto the discharge plate P. At the end of the cycle, the contacts S3-1B in line L-27 open to step the relays 4S1A and 4S1B to the fifth step, so that the cycle may again be repeated. The functions are repeated every four steps and it is noted that the relay 4S2 is not used to hold the relays 4S1A and 4S1B in the same step to cause a function to be repeated.

In forming the "3R" pattern illustrated in FIG. 17, the selector switch is turned to position "3" (FIG. 14a) and the contacts SS-1A, SS-1B, SS-1D, SS-1F, SS-1I and SS-1K are closed. The clutch coil CL' in line L-5 is energized to drive the conveyor C until the limit switch LS-1 is actuated to open contacts LS-1a in line L-5 and the conveyor C is stopped. When the limit switch LS-1 is actuated, the clutch coils CL1' and CL2' are energized through the closed contacts LS-1c and S1-1A in line L-8 and the closed contacts SS-1A in line L-11. When the pusher assemblies P1 and P2 move five loaves from the conveyor C onto the turntable, the limit switch LS-1 is released and the conveyor C again starts to move loaves toward the limit switch LS-1. At this time, the relay 4S2 is stepped to the second step, while the relays 4S1A and 4S1B remain in step 1. When the limit switch LS-1 is again actuated, the conveyor C stops and pusher assemblies P1 and P2 again cycle to release the limit switch LS-1 and start the conveyor C operating. At this time, the relays 4S1A and 4S1B step to the second step, and the relay 4S2 is simultaneously stepped to the third step. The circuit is now completed from the line L-10 through the closed contacts SS-1D to energize the rotator clutch coil R' in line L-15 to rotate the turntable T. As occurred in the formation of the "2R" pattern, because the contacts SS-1B are closed, the normally closed contacts LS-3a are by-passed in line L-14 so that the turntable T is rotated 180° to turn the first two rows of loaves on the turntable T 180°. When the limit switch LS-2 is actuated to open the contacts LS-2b, the relays 4S1A and 4S1B are stepped to the third step, and the relay 4S2 is stepped to the fourth step. When a full complement of loaves are again delivered to the limit switch LS-1, the limit switch LS-1 is actuated and the conveyor C stops and the clutch coils CL1' and CL2' are again energized to drive the pusher assemblies P1 and P2 to move a third row of five loaves from the conveyor C onto the turntable T so that the tails of the loaves in the third row are in abutting relation with the loaves in the first row. When the limit switch LS-1 is again released, the conveyor C again starts and the relays 4S1A and 4S1B are stepped to the fourth step. With the relays 4S1A and 4S1B in step four, the clutch coil CL-3' is energized to drive the pusher assembly P3 and, at the end of its sweep, the relays 4S1A, 4S1B and 4S2 are stepped to the fifth step and the cycle is repeated.

To form the "1R1" pattern illustrated in FIG. 18, the selector switch is moved to position "4" (FIG. 14a), and the selector switch contacts SS-1D, SS-1E, SS-1I, SS-1J and SS-1L are closed. With the contacts SS-1L closed in line L-22, the solenoid TL' is energized to move the loaf guard G forward. When the conveyor C delivers loaves against the limit switch LS-1, the contacts LS-1a open to stop the conveyor C and the contacts LS-1c close to energize the clutch coil CL2' so that the second pusher assembly P2 cycles to move one loaf onto the turntable T. When the loaf is moved away from the conveyor to release the limit switch LS-1, the conveyor again starts and the relays 4S1A and 4S1B are stepped to the second step. At this time, the switch arm 132 in line L-22 is moved into engagement with the fixed contact 131 so that the loaf guide solenoid TL' is deenergized and the loaf guide G is returned to its original position to energize the limit switch LS-4. With the relays 4S1A and 4S1B in the second step, the rotator clutch coil R' is energized through the closed contacts SS-1D to rotate the signal loaf on the turntable 90 degrees until the limit switch contacts LS-3a are opened. The opening of the contacts LS-3a provides the stepping pulse for stepping the relays 4S1A and 4S1B to the third step. The loaves are again moved forward on the conveyor C to actuate the limit switch LS-1 and stop the conveyor C. With the relays 4S1A and 4S1B in the third step, the circuit is complete to energize the relay CR-1 to energize the clutch coils CL1' and CL2' and drive the pusher assemblies P1 and P2 to move five loaves off the conveyor C onto the turntable T until the tails of the second row of loaves are in abutting relation with the one crosswisely extending loaf. As the limit switch LS-1 is released, the conveyor again starts and the relays 4S1A and 4S1B are stepped to the fourth step. At this time, the clutch coil CL3' is energized and the pusher assembly P3 cycles. When the pusher assembly P3 completes its cycle, the switch contacts S3-1B open to step the relays 4S1A and 4S1B to the fifth step and the cycle is repeated. The relay 4S2 is not used in the formation of the "1R1" pattern to hold the relays 4S1A and 4S1B in the same step to repeat a function.

In forming the "2R1" pattern illustrated in FIG. 19, the selector switch is moved to position 6 (FIG. 14a), and the selector switch contacts SS-1D, SS-1G, SS-1I, SS-1J, and SS-1L, are closed. Because the contacts SS-1L are closed, the loaf guide G is moved to its operative position. When the limit switch LS-1 is actuated, the conveyor C is stopped and the clutch coil CL-2' is actuated to drive the pusher assembly P2 which sweeps a single loaf onto the turntable T. When the limit switch LS-1 is released, the conveyor C again starts and the relays 4S1A, 4S1B and 4S2 are stepped to the second step and the loaf guide G is retracted. The turntable T is driven, as the rotator clutch coil R' is energized, to rotate the turntable and the single loaf thereon 90°. When the limit switch LS-3 is actuated to open the contacts LS-3a, the relays 4S1A, 4S1B, and 4S2 are stepped to the third step. When a full complement of loaves is at the transfer station S to actuate the limit switch LS-1, the conveyor again stops and the relay CR-1 is energized to actuate the clutch coils CL1' and CL2' to drive the two pusher assemblies P1 and P2 simultaneously to move a full complement of five loaves onto the turntable T. When the loaves are thus moved to release the limit switch LS-1, the conveyor C starts operating and the relay 4S2 is stepped to the fourth step while the relays 4S1A and 4S1B remain in the third step. When a full complement of loaves is again delivered to the transfer station S to actuate the limit switch LS-1, the conveyor C is stopped and the pusher assemblies P1 and P2 again cycle together to move a third row of five loaves into abutting relation with the second row of five loaves. When the third row is removed from the conveyor C, the limit switch LS-1 is released and the conveyor C starts while the relays 4S1A and 4S1B are stepped to the fourth step. At this time, the clutch coil CL3' is energized to drive the pusher assembly P3 and at the end of the cycle of pusher assembly P3, the relays 4S1A, 4S1B and 4S2 step to the fifth step so that the cycle may be repeated.

When the "1R2" pattern illustrated in FIG. 20 is to be formed, the selector switch is moved to position "5" (FIG. 14a) so that the contacts SS-1D, SS-1I, SS-1J, SS-1K and SS-1L, are closed. The loaf guide G is moved to its operative position and when a full complement of loaves is delivered to the transfer station S, the limit switch LS-1 is actuated and the conveyor C stops. The pusher assembly P2 is energized as the clutch coil CL2' is energized to move a single loaf onto the turntable T. When the limit switch LS-1 is released, the conveyor C again starts and the relay 4S2 steps to the second step while the relays 4S1A and 4S1B remain in the first step. When a full complement of loaves is again at station S to actuate the limit switch LS-1, the conveyor C again stops and the pusher assembly P2 again cycles to push a second loaf onto the turntable T in longitudinal alignment with the first loaf. As the second loaf is moved onto the turntable T, the limit switch LS-1 is again released to start the conveyor C. The relays 4S1A and 4S1B are stepped to the second step while the relay 4S2 is stepped to the third step. At this time, the loaf guide G is retracted. As the rotator clutch coil R' is energized through the closed contacts SS-1D, the turntable T is driven 90° until the limit switch contacts LS-3a are opened to step the relays 4S1A and 4S1B to the third step and the relay 4S2 is stepped to the fourth step. When the conveyor C again delivers sufficient bread loaves to the transfer station S to actuate the limit switch LS-1, the conveyor C stops and the pusher assemblies P1 and P2 are operated as the clutch coils CL1' and CL2' are energized to sweep a row of five loaves from the conveyor C to the turntable T. When the limit switch LS-1 is released, the conveyor C again starts and the relays 4S1A and 4S1B are stepped to the fourth step while the relay 4S2 remains in the fourth step. At this time, the clutch coil CL-3' is energized to drive the pusher assembly P3. At the end of the cycle of pusher assembly P3, the relays 4S1A, 4S1B and 4S2 are stepped to the fifth step as the opening of the contacts S3-1B provide the necessary stepping pulse. The cycle is then repeated.

The cycle of operation to form the 1R1' and 1R1" patterns illustrated in FIGS. 22 and 24 is identical to operation described for forming the "1R1" pattern illustrated in FIG. 18, however, the effective length of bar 80 of pusher assembly P2 is increased by adjusting the telescoping sections 80a and 80b so as to move two and three loaves respectively when the pusher assembly P2 is operated individually. The telescoping section 80a and 80b of the pusher assembly P1 are adjusted so that the effective length of the bar 80 of pusher assembly P1 is decreased a corresponding amount so that the pusher P1, if operated individually, would sweep three and two loaves respectively, off the conveyor C.

The cycle of operation of form the 2R1' and 2R1" patterns illustrated in FIGS. 23 and 25 is identical to the cycle of operation used to form the 2R1 pattern illustrated in FIG. 19, however, the effective lengths of the bars 80 of thee pusher assemblies P1 and P2 are adjusted mechanically so that the pusher assembly P2, when operating alone, will move two and three loaves respectively, while the combined pusher assemblies P1 and P2, when operating simultaneously, will move five loaves.

The cycle of operation in forming the 1R2' and 1R2" patterns illustrated in FIGS. 26 and 28 is identical to the cycle of operation used to form the 1R2 pattern illustrated in FIG. 20, however, the effective lengths of the bars 80 of the pusher assemblies P1 and P2 are adjusted so that the pusher P2, when operating individually, will move two and three loaves respectively from the conveyor C to the turntable T. The effective length of the pusher assembly P1 is decreased an amount corresponding to the increase in the length of pusher assembly P2 so that when the pusher assemblies P1 and P2 are operating together, they will move five loaves from the conveyor C to the turntable T.

The cycle of operation in forming the 2R2' and 2R2" patterns illustrated in FIGS. 27 and 29 is identical to the cycle of operation in forming the 2R2 pattern illustrated in FIG. 21, however, the effective length of the pusher bar 80 of pusher assembly P1 is increased to move two and three loaves respectively from the conveyor C while the effective length of the pusher bar 80 of the pusher assembly P2 is decreased by a like amount.

It should be understood from the disclosure that the relay 4S2 is used only when an operation is to be repeated before another operation is commenced. For example, if two single rows are to be moved onto the turntable T before the turntable is rotated, the stepping relay 4S2 permits the operation to repeat itself before the relay 4S1A and 4S1B are stepped to the next position.

Further, it is to be understood that the term "row" as used herein does not require more than a single product.

It should be further understood that the same patterns can be formed even if the loaves received on the conveyor C are all oppositely disposed such that the tails $t$ face conveyor side rail 36 rather than conveyor side rail 38. In this instance, the conveyor C is merely turned end for end. In order to form the basic seven patterns, the effective lengths of the bars 80 for pusher assemblies P1 and P2 are then shortened and lengthened respectively so that the pusher assembly P2 when driven alone, will sweep a pre-selected number of loaves (one to three) off the conveyor C and the pusher assemblies P1 and P2, when driven together will move a second pre-selected number of loaves (i.e. five). The output of the air valves actuated by the clutch coils CL-1' and CL-2' are merely disconnected from the respective clutches CL1 and CL2 and reconnected with the clutches CL2 and CL1 respectively, so that when the clutch coil designated CL1' is energized, the clutch CL2 will couple the output of the motor M1 with the pusher assembly P2. Instead of reconnecting the air valves, the proper actuation of the pusher assemblies P1 and P2 could also be effected by substituting, in circuit, the clutch coil CL-2' for the clutch coil CL-1' and the clutch coil CL-1' for the clutch coil CL-2. The "Gemco" switch assemblies are adjusted as necessary.

It should be realized that the delivery conveyor may deliver bread loaves from more than one bagging machine and that the discharge conveyor may receive groups of bread loaves from a plurality of pattern makers.

It is also to be understood that the sequence of operation and, consequently the physical orientation of the patterns formed, can be changed with only minor modifications and fully within the scope of this invention.

It should further be understood that the loaves may vary in size and that patterns will be selected which will enable the maximum number of loaves to be placed in the containers which may also vary in size within a predetermined range as determined by the size of the pattern forming apparatus.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

We claim:

1. Pattern forming apparatus for assembling food products, such as packaged loaves of bread, in a predetermined array, comprising:

longitudinally extending conveying means for conveying products in a path of travel and in a predetermined orientation;

product turning means for receiving products from said conveying means and turning said products through at least a partial revolution so as to reorient said products;

means adjacent said conveying means for moving said articles from said cOnveying means to said product turning means comprising a pair of longitudinally disposed, end-to-end transfer means selectively movable to move selected ones of said products from said conveying means onto said product turning means; and means for selectively moving one or both of said pair of product transfer means to move selected ones of said products from said conveying means onto said product turning means.

2. Pattern forming apparatus as set forth in claim 1 wherein said conveying means comprises a longitudinally extending conveyor extending along only one side of said product turning means, said pair of transfer means comprises a pair of end-to-end pusher means, and means mounting said pair of end-to-end pusher means for movement in a lateral path to sweep said products from said conveyor onto said product turning means.

3. Pattern forming apparatus as set forth in claim 1 wherein said means for selectively moving said pair of product transfer means comprises means for moving one of said pusher means individually to move at least one product from said conveying means to said turning means, and means for then simultaneously moving said pair of pusher means to move a plurality of products from said conveying means into abutting relation with said one product moved onto said turning means.

4. Pattern forming apparatus as set forth in claim 1 wherein said article turning means comprises a rotatable turntable, and means for selectively rotating said turntable through 90° or 180° to reorient said products.

5. Pattern forming apparatus as set forth in claim 1 including a product guide member pivotally movable from a generally transversely extending guide position in juxtaposition with said turning means to a removed, inoperative position out of the path of the products moving through said partial revolution on said turning means.

6. Pattern forming apparatus as set forth in claim 1 wherein each of said end-to-end transfer means comprises a pair of relatively movable pusher members which are longitudinally adjustable relative to each other to selectively span selected ones of said products on said conveying means.

7. Pattern forming apparatus as set forth in claim 1 including sweep means for moving the products off said turning means.

8. Pattern forming apparatus for grouping products, such as packaged bread loaves, into predetermined patterns comprising:
  conveying means for successively conveying a series of products in a longitudinal path;
  product turning means for receiving products from said conveying means and turning them through at least a partial revolution to reorient said products relative to their former position on said conveying means;
  means for laterally transferring a first portion of said products from said conveying means to said product turning means;
  means for selectively turning said product turning means to reorient the transferred portion relative to its former position on said conveying means; and
  means for laterally transferring a second portion of said products from said conveying means to a position on said turning means adjacent, and in a common plane with, the reoriented first portion to form a grouping of products in a predetermined common plane pattern.

9. Pattern forming apparatus as set forth in claim 8 wherein said turning means comprises a rotatable turntable, and said means for selectively turning said product turning means includes means for selectively rotating said turntable 90° or 180°.

10. Pattern forming apparatus as set forth in claim 8 wherein said conveying means includes means for moving at least a part of said second portion forwardly to occupy space vacated by said first portion of said products prior to transfer of said second portion to said turning means.

11. Pattern forming apparatus as set forth in claim 8 wherein said product turning means comprises a rotatable turntable; said means for turning said product turning means comprises means for rotating said turntable 180° to turn the transferred products of said first portion end-for-end; a discharge station; and means for sweeping the group of products transferred to said turntable from said turntable to a discharge station.

12. Pattern forming apparatus as set forth in claim 8 wherein said turning means comprises a rotatable turntable and said means for selectively turning said product turning means includes means for turning said turntable 90° to turn the transferred products of said first portion crosswisely relative to their previous position on said conveying means to form a group of products in a predetermined pattern.

13. Pattern forming apparatus as set forth in claim 12 including means for transferring a third portion of products from said conveying means into abutting relation with the transferred products of said second portion on said turning means to form a group of products in a predetermined pattern.

14. Pattern forming apparatus as set forth in claim 12 wherein said means for transferring said first portion of said products comprises means for transferring at least one product endwisely onto said turntable and then transferring at least a second product endwisely into end-to-end relation with said one product positioned on said turntable; said means for selectively turning said product turning means includes means for turning said first and second products to a position crosswisely of their positions on said conveying means; said means for transferring said second portion includes means for laterally transferring a plurality of said products endwisely from said transfer station to a position adjacent said first and second turned products to group the products in a predetermined pattern; a discharge station; and means for sweeping the group of transferred products from said turntable to said discharge station.

15. Pattern forming apparatus for grouping food products, such as packaged bread loaves into patterns, comprising:
  product support means for supporting a longitudinally extending row of individual products in side-by-side relation;
  product turning means for receiving said products from said product support means and turning them through a partial revolution in a turning path;
  transfer means for transferring a portion of said products endwisely from said product support means to said product turning means;
  guide means movable from an inoperative position to a transversely extending guiding position in juxtaposition with said turning means for guiding the products being pushed endwisely onto said turning means;
  means for selectively operating said turning means to turn products supported thereon; and
  means for moving said guide means between said guiding position and said inoperative position out of the turning path of said products on said turning means to permit the products thereon to move in said turning path.

16. Pattern forming apparatus as set forth in claim 15 including a discharge station and means for sweepng the transferred products from said turning means to a discharge station.

17. Pattern forming apparatus for assembling food products, such as packaged loaves of bread, in a predetermined array, comprising:
  product turning means for turning products positioned thereon in a predetermined orientation through a partial revolution to reorient the products;
  product support means for supporting a series of longitudinally disposed products adjacent said turning means;
  means for moving said longitudinally disposed products from said support means to said product turning means and including first and second pusher means longitudinally disposed in end-to-end relation and movable in transversely extending paths to selectively move selected portions of said products on said conveying means to said turning means;
  each of said pusher means including pusher members which are longitudinally adjustable so as to selectively span selected, differing ones of said products positioned on said support means.

18. A method of grouping food products, such as elongate packaged bread loaves, into patterns comprising the steps of:
  successively conveying a series of such products, in broadside disposition, in a longitudinal path of travel to a transfer station;
  moving a first portion of said products positioned at said transfer station endwisely in a path transverse to said longitudinal path, and reorienting said first portion relative to its position at said transfer station;

and then moving a second portion of said products from said transfer station endwisely in a transversely extending path to a position adjacent and in a common plane with the reoriented products of said first portion to form a common plane pattern of grouped products.

19. The method of claim 18 wherein the turning of said first portion is accomplished by turning the products of said first portion end-for-end.

20. The method of claim 19 wherein the moving of said second portion is accomplished by moving one group of said products transversely into abutting relation with said first portion and then moving another group of said products into abutting relation with said one group.

21. The method of claim 18 wherein the turning of said first portion is accomplished by turning product of said first portion crosswisely relative to their position at said transfer station and wherein the moving of said second portion is accomplished by moving one group of products endwisely from said transfer station into abutting relation with said crosswisely turned products.

22. The method of claim 21 wherein the moving of said second portion includes moving another group of products from said transfer station into abutting relation with said one group of products.

23. The method of claim 18 wherein the moving of said first portion is accomplished by moving one of said products transversely from said transfer station, moving another one of said products into the position vacated by said one product; then moving said other one of said products transversely into end-to-end abutting relation with said one product.

24. The method of claim 23 wherein the turning of said first portion is accomplished by turning the products positioned in end-to-end relation to a position crosswise to their orientation at said transfer station, and wherein the moving of said second portion is accomplished by moving a group of products endwisely from said transfer station into abutting relation with said crosswisely extending products.

25. The method of claim 24 wherein the moving of said second portion includes longitudinally moving at least a part of said group of products into the space vacated by the first group of transferred products and then transversely moving said group of products into abutting relation with the product of said first group.

26. Pattern forming apparatus for grouping food products, such as packaged bread loaves, into patterns comprising:

conveying means for successively forwardly moving a plurality of longitudinally proceeding products, having a predetermined orientation, in a longitudinal path of travel;

transversely movable means for moving a first portion of said products transversely from said conveying means;

turning means for receiving said first portion and turning it through a partial revolution so as to reorient said first portion relative to its former position on said conveying means;

said conveying means including means for moving a second portion of said products immediately following said first portion forwardly so that at least a part of the products of said second portion occupies space on said conveying means vacated by said first portion; and means for transversely moving said second portion from said transfer station to a position adjacent, and in a common plane with, the turned first portion while maintaining the orientation of said second portion the same as its orientation at said transfer station to form a common plane pattern of grouped products.

27. Apparatus for grouping food products, such as loaves of bread, into selected ones of a plurality of different patterns, comprising:

means for successively conveying a plurality of products in a longitudinal path to a transfer station;

means responsive to the positioning of products at said transfer station for selectively halting the flow of products on said conveying means;

rotatable means for receiving products from said conveying means and turning them relative to their former position at said transfer station;

first and second pusher means for pushing the halted products from said conveying means to said turning means;

first and second drive control means for selectively driving said first and second pusher means;

third drive control means for selectively driving said turning means;

control circuit means adapted to be connected to a source of power and including first, second and third actuating means selectively energizable for selectively coupling said first, second and third drive control means to said first and second pusher means and said turning means, respectively, and selector switch means for selecting the sequence in which said first, second and thrid actuating means are energized from a number of possible sequences.

28. A method of grouping food products, such as packaged bread loaves, into a predetermined array, comprising the steps of:

successively conveying a plurality of products, having a predetermined orientation, forwardly in a longitudinal path of travel;

moving a first portion of said products transversely of said longitudinal path of travel to a support and turning the support through a partial revolution so as to reorient said first portion;

conveying a second portion of said products forwardly so that at least a part of said products of said second portion occupies space vacated by said first portion on said conveying means; and moving said second portion of said products transversely of said longitudinal path to a position adjacent, and in a common plane with, the reoriented first portion while maintaining the orientation of said second portion generally the same as their orientation on said conveying means to group the products in a common plane array having the predetermined pattern.

29. Pattern forming apparatus for selectively grouping products into any one of a plurality of different patterns comprising:

conveying means for conveying products in a longitudinal path;

turning means for receiving products from said conveying means and turning the received products through a partial revolution;

first and second transfer means for transferring products from said conveying means to said turning means; and control circuit means adapted to be connected with a source of power and comprising:

first drive control means for selectively causing said first transfer means to be driven;

second drive control means for selectively causing said second transfer means to be driven when the first transfer means is driven;

third drive control means for selectively causing said turning means to be driven when at least one of said first and said second transfer means have been driven to transfer products to said turning means; and selector switch means connected in circuit with said first and second drive control means for selectively connecting said first and second drive control means with said power source to selectively operate said first drive control means individually for individually driving said first transfer means to transfer products to said turning means and to selectively operate said first and second drive control means simultaneously to simultaneously drive said first and second transfer means to transfer products from said conveying means to said turning means;

said selector switch means including means for selectively connecting said third drive control means with said source of power to selectively operate said third drive control means for selectively driving said turning means after said first transfer means individually, or first and second trnasfer means collectively, have transferred products thereto.

30. Pattern forming apparatus as set forth in claim 29 wherein said control circuit includes logic circuit means connected in circuit with said selector switch means for controlling the sequence in which said first, second and third drive control means are connected with said source of power to selectively operate said first drive control means individually to drive said first transfer means to deliver at least one of said products to said turning means and then to operate said first and second drive control means simultaneously to deliver a first group of products to said turning means after said drive control means operates to turn said one product moved to the turning means by said first transfer means.

31. Pattern forming apparatus as set forth in claim 30 wherein said logic circuit means includes means for selectively continuing to operate said first drive control means to drive said transfer means to deliver at least a second one of said products to said turning means prior to the simultaneous operation of said first and second drive control means.

32. Pattern forming apparatus as set forth in claim 30 wherein said logic circuit means includes means for selectively continuing to operate said first and second drive means simultaneously after said first group of products has been delivered to deliver a second group of products to said turning means.

33. Pattern forming apparatus for grouping food products, such as packaged bread loaves, into a predetermined array comprising:

means for successively conveying products, having a predetermined orientation, forwardly in a longitudinal path of travel to a transfer station;

means for moving a first portion of said products transversely from said transfer station and turning it substantially 180 degrees in such a manner that the turned portion is in generally end-for-end opposing relation to its former position on said conveying means; and means for transversely moving a second portion of products from said conveying means to a position adjacent said first portion while maintaining the orientation of the second portion the same as its orientation on said conveying means.

34. Pattern forming apparatus for grouping food products, such as loaves of bread, into a selected pattern of a plurality of different patterns comprising:

means for successively conveying a line of products in a longitudinal path of travel;

control circuit means adapted to be connected with a source of power;

means connected in said control circuit means for moving the products from the conveying means and grouping the products into at least two adjacent rows disposed in a common plane; and means connected in said control circuit means with said moving and grouping means for selecting the number of rows to be grouped in said pattern by said grouping means;

said moving and grouping means including rotatable turning means connected in said control circuit for selectively turning the product in at least one of said rows to reorient product in said one row relative to the orientation of product in another row.

35. Pattern forming apparatus as set forth in claim 34 wherein said turning means includes first drive means connected in said circuit means for selectively rotating said rotatable means.

36. Pattern forming apparatus as set forth in claim 35 wherein said moving and grouping means includes transversely movable transfer means for transferring products from said conveying means to said turning means, and second drive means connected in said circuit means for selectively driving said transfer means to move products from said conveying means to said turning means.

37. Pattern forming apparatus as set forth in claim 36 wherein said transfer means comprises first and second individually movable pusher members for selectively transferring products from said conveying means to said turning means; said second drive means including first and second drive members selectively operable to selectively operate said first and second pusher members individually or simultaneously.

38. A method of grouping bread products, such as bread loaves, into patterns comprising the steps of:

successively conveying a plurality of products, having a predetermined orientation, in a longitudinal path of travel to a transfer station;

moving a first portion of said products transversely from said longitudinal path of travel at said transfer station and turning said first portion end-for-end relative to said predetermined orientation; and transversely moving a second portion of products from said transfer station to a position adjacent, and in a common plane with, said first portion while maintaining the orientation of said second portion the same as said predetermined orientation to form a common plane array of products having a predetermined pattern.

39. Pattern forming apparatus for grouping first and second portions of a line of conveyed products, such as packaged bread loaves, in a predetermined array comprising:
  conveying means for successively forwardly conveying products, in a particular orientation, in a longitudinal path of travel and sequentially transferring said first and second portions therefrom; and
  turntable means alongside said conveying means for receiving said first portion of said products from said conveying means and reorienting said first portion end-for-end so that the reoriented first portion is in opposing relation to its former orientation on said conveying means;
  said conveying means including transversely movable means for moving said second portion of said products transversely to said path of travel to join said second portion with said reoriented portion in a common plane product pattern.

40. Pattern forming apparatus for grouping first and second portions of a line of conveyed products, such as packaged bread loaves, in a predetermined array comprising:
  electrical circuit means adapted to be connected with an electrical power source;
  conveying means connected therein for successively forwardly conveying products, in a particular orientation, in a longitudinal path of travel and sequentially transferring said portions therefrom;
  product turning means, mounted for turning movement, for receiving said first and second portions sequentially; and
  means connected in said circuit means for angularly moving said product turning means to a different angular position between the reception of said first and second portions;
  said conveying means including transversely movable means for moving said products transversely to said path of travel to transversely transfer said portions from said conveying means to said product turning means and to form a predetermined common plane array of products thereon.

41. The combination defined in claim 40 in which said product turning means comprises rotatable turntable means and said control means rotates said turntable means substantially 90°.

42. The combination defined in claim 40 in which said product turning means comprises rotatable turntable means and said control means rotates said turntable means substantially 180°.

43. The combination defined in claim 40 in which said product turning means comprises rotatable turntable means; and selector means is connected in said circuit means and is settable to designate the desired rotation of said turntable means to substantially 90° or 180° of rotation, and said control means rotates said turntable means either 90° or 180° dependent on the setting of said selector means.

44. The pattern forming apparatus of claim 40 wherein said transversely movable means comprises a pair of longitudinally disposed, end-to-end transfer means selectively movable to move selected ones of said products out of said longitudinal path of travel onto said product turning means, and means for selectively moving one or both of said pair of product transfer means to move selected ones of said products onto said product turning means.

45. The pattern forming apparatus as set forth in claim 44 wherein said conveying means comprises a longitudinally extending conveyor extending along only one side of said product turning means, said pair of transfer means comprises a pair of end-to-end pusher means, and means mounts said pair of end-to-end pusher means for movement in a transverse path of travel to sweep said products from said conveyor onto said product turning means.

46. Pattern forming apparatus as set forth in claim 44 wherein said means for selectively moving said pair of product transfer means comprises means for moving one of said product transfer means individually to move at least one product to said turning means, and means for thereafter simultaneously moving said pair of product transfer means to move a plurality of products into abutting relation with said one product.

47. Pattern forming apparatus as set forth in claim 44 wherein each of said end-to-end transfer means comprises a pair of relatively movable pusher members which are longitudinally adjustable relative to each other to selectively span a selected number of products.

48. The pattern forming apparatus as set forth in claim 40 wherein said means for moving products transversely comprises first and second transfer means for transferring products to said product turning means; said electric circuit means includes first drive control means for selectively causing said first transfer means to be driven, second drive control means for selectively causing said second transfer means to be driven when the first transfer means is driven, third drive control means for selectively causing said turning means to be driven when at least one of said first and second transfer means have been driven to transfer products to said turning means, and selector switch means connected in circuit with said first and second drive control means for selectively connecting said first and second drive control means with said power source to selectively operate said first drive control means individually for individually driving said first transfer means to transfer products to said product turning means or to selectively operate said first and second drive control means simultaneously to simultaneously drive said first and second transfer means and transfer products to said product turning means; said selector switch means including means for selectively connecting said third drive control means with said source of power to selectively operate said third drive control means to selectively drive said turning means after said first transfer means individually, or first and second transfer means collectively, have transferred products thereto.

49. Pattern forming apparatus as set forth in claim 48 wherein said electrical circuit includes logic circuit means connected in circuit with said selector switch means for controlling the sequence in which said first, second and third drive control means are connected with said source of power to selectively operate said first drive control means individually to drive said first transfer means to deliver at least one of said products to said turning means and then to operate said first and second drive control means simultaneously to deliver a first group of products to said turning means after said drive control means operates to turn said one product moved to the turning means by said first transfer means.

50. Pattern forming apparatus as set forth in claim 49 wherein said logic circuit means includes means for selectively continuing to operate said first drive control means to drive said transfer means to deliver at least a second one of said products to said turning means prior to the simultaneous operation of said first and second drive control means.

51. Pattern forming apparatus as set forth in claim 49 wherein said logic circuit means includes means for selectively continuing to operate said first and second drive means simultaneously after said first group of products has been delivered to deliver a second group of products to said turning means.

52. Pattern forming apparatus for grouping first and second portions of a line of conveyed food products, such as loaves of bread, into one of a plurality of different patterns comprising:
   conveying means for successively conveying products, in a particular orientation, in a longitudinal path of travel and for transferring said first and second portions therefrom;
   turntable means for receiving said first and second portions and supporting the portions during pattern formation;
   means for rotating said turntable means through a partial revolution to a different angular position for reorienting one of said portions relative to its former orientation on said conveying means;
   electrical control circuit means for controlling a pattern forming cycle delimited by formation of a common plane pattern of products;
   said conveying means including means connected in said control circuit means and controlled thereby for transversely moving at least first and second portions from the conveying means to adjacent positions on said turntable support means to cyclically form a common plane pattern;
   means operative to discharge a pattern formed from said turntable means; and
   a control connected in said circuit means for cyclically operating said means operative to separately discharge each pattern formed.

53. Pattern forming apparatus for grouping portions of a line of conveyed food products, such as loaves of bread, into one of a plurality of different patterns comprising:
   conveying means for successively conveying products, in a particular orientation, in a longitudinal path of travel;
   turntable means for receiving products from the conveying means and supporting the products during pattern formation;
   electrical control circuit means for controlling a pattern forming cycle delimited by formation of a common plane pattern of products from portions of said line;
   means connected in said control circuit means and controlled thereby for moving at least first and second rows of products, each of which includes one or more products, from the conveying means to adjacent positions in a common plane on said turntable means to form a common plane product pattern during a cycle;
   means for driving said turntable means angularly to a 180° reoriented position to reorient one of said rows making up the pattern relative to its former orientation on said conveying means during a cycle;
   said circuit means including settable means for selecting the number of rows to be grouped in a common plane pattern during a cycle;
   means operative to separately discharge each pattern formed from said turntable means; and
   a control connected in said circuit means for cyclically operating said means operative to discharge said common plane pattern.

54. Pattern forming apparatus for grouping portions of a line of conveyed food products, such as loaves of bread, into one of a plurality of different patterns comprising:
   conveying means for successively conveying products, in a particular orientation, in a longitudinal path of travel;
   turntable means for receiving products from the conveying means and supporting the products during pattern formation;
   electrical control circuit means for controlling a pattern forming cycle delimited by formation of a common plane pattern of products from portions of said line;
   means operative to discharge a pattern formed from said turntable means;
   a control connected in said circuit meanS for operating said means operative to cyclically separately discharge each pattern formed;
   means connected in said control circuit means and controlled thereby for moving at least first and second portions from the conveying means to adjacent positions in a common plane on said turntable means to form a common plane product pattern during a cycle; and
   means for driving said turntable means angularly to a 180° reoriented position between movements of said first and second portions to said turntable means to oppositely reorient one of said portions making up the pattern relative to its former orientation on said conveying means during a cycle;
   said circuit means including settable means for selecting the number of portions to be grouped in a common plane pattern during a cycle.

55. Pattern forming apparatus for grouping first and second portions of a line of conveyed products, such as packaged bread loaves, in a predetermined array comprising: electrical circuit means adapted to be connected with a source of electrical power;
   conveying means connected therein for successively forwardly conveying products, in a particular orientation, and in a longitudinal path of travel;
   loaf turning means mounted for angular movement for sequentially receiving said first and second portions and for reorienting at least one of said first and second portions;
   transfer means connected in said circuit means for sequentially transferring said first and second portions from said conveying means to said loaf turning means to form a predetermined common plane array of products thereon;
   said transfer means including means for selectively moving either one product only, or a plurality of products, from said conveying means;
   means selectively settable to select whether said transfer means will move one product individually or a plurality of products simultaneously in transferring each of said portions from said conveying means to said loaf turning means;

control means connected in said circuit means for angularly moving said loaf turning means to a different angular position between reception of said first and second portions to reorient said one portion; and a control connected in said circuit means responsive to the setting of said settable means for determining whether said transfer means will be operable to transfer one individual product only or a plurality of products simultaneously.

* * * * *